US011965512B2

(12) United States Patent
Lechner et al.

(10) Patent No.: US 11,965,512 B2
(45) Date of Patent: Apr. 23, 2024

(54) DUAL BODY VARIABLE DUTY PERFORMANCE OPTIMIZING PUMP UNIT

(71) Applicant: S.A. Armstrong Limited, Scarborough (CA)

(72) Inventors: Gabor Lechner, Scarborough (CA); Marcelo Javier Acosta Gonzalez, Scarborough (CA); Rohit Mohindra, Scarborough (CA); Santhosh Vijayan, Scarborough (CA)

(73) Assignee: S.A. Armstrong Limited, Scarborough (CA)

( * ) Notice: Subject to any disclaimer, the term of this patent is extended or adjusted under 35 U.S.C. 154(b) by 0 days.

(21) Appl. No.: 18/206,537

(22) Filed: Jun. 6, 2023

(65) Prior Publication Data

US 2023/0313802 A1 Oct. 5, 2023

Related U.S. Application Data

(63) Continuation of application No. 16/461,274, filed as application No. PCT/CA2017/050648 on May 29, 2017, now Pat. No. 11,732,719.

(Continued)

(51) Int. Cl.
*F04D 13/14* (2006.01)
*F04D 15/00* (2006.01)
*F04D 29/40* (2006.01)

(52) U.S. Cl.
CPC ......... *F04D 13/14* (2013.01); *F04D 15/0016* (2013.01); *F04D 15/0066* (2013.01); *F04D 29/406* (2013.01); *F05D 2270/02* (2013.01)

(58) Field of Classification Search
CPC ............. F04D 15/0066; F04D 15/0083; F04D 15/0016; F04D 15/0088; F04D 15/029;

(Continued)

(56) References Cited

U.S. PATENT DOCUMENTS

D32,454 S * 4/1900 Peters
2,810,345 A 10/1957 Englesson (Continued)

FOREIGN PATENT DOCUMENTS

CN 2043284 U 8/1989
CN 2434454 6/2001

(Continued)

OTHER PUBLICATIONS

FC-FCT Series, In-line electric pumps single and twin equipped with IE2/IE3 motors complying with regulation (EC) No. 640/2009, Rev.B Ed.Jun. 2012 (Year: 2012).*

(Continued)

*Primary Examiner* — Nathan C Zollinger

(74) *Attorney, Agent, or Firm* — Bret E. Field; Bozicevic, Field & Francis LLP

(57) ABSTRACT

A dual pump unit having a pair of pumps that provide parallel hydraulic paths, and are configured to operate concurrently in opposite rotational directions. The dual pump unit has a sealed casing which includes a suction flange, two volutes in hydraulically parallel configuration, and a discharge flange. The pair of pumps are located within a respective volute of the casing and, in an example, are radially inline and horizontally inline. The casing may include a flattened bottom. Each pump may include a touchscreen for configuration of the respective pump. The pumps are controllable to circulate a circulating medium to collectively provide output to source a load.

7 Claims, 37 Drawing Sheets

Related U.S. Application Data

(60) Provisional application No. 62/451,219, filed on Jan. 27, 2017.

(58) Field of Classification Search
CPC .......... F04D 13/06; F04D 13/12; F04D 13/14; F04D 29/605; F04D 29/4293; F04D 29/326; F04D 29/406; F04D 1/003; F04D 27/004; F04D 25/06
See application file for complete search history.

(56) References Cited

U.S. PATENT DOCUMENTS

| | | | | |
|---|---|---|---|---|
| 4,177,018 | A | 12/1979 | Granet | |
| 5,139,397 | A | 8/1992 | Strelow | |
| 5,178,520 | A | 1/1993 | Strelow | |
| 5,566,709 | A | 10/1996 | Fujii et al. | |
| D440,230 | S | 4/2001 | Craford et al. | |
| D647,537 | S | 10/2011 | Mehnert et al. | |
| 8,376,698 | B2 | 2/2013 | Vedsted | |
| 9,051,936 | B2 | 6/2015 | Kallesoe et al. | |
| 9,823,627 | B2 | 11/2017 | Acosta Gonzalez | |
| 11,732,719 | B2 * | 8/2023 | Lechner | F04D 15/0016 417/2 |
| 2005/0196269 | A1 | 9/2005 | Racer et al. | |
| 2011/0289675 | A1 | 12/2011 | Dunki-Jacobs et al. | |
| 2011/0301766 | A1 | 12/2011 | Higgins et al. | |
| 2012/0078424 | A1 | 3/2012 | Raghavachari | |
| 2014/0026598 | A1 * | 1/2014 | Trawicki | F25B 49/005 62/126 |
| 2015/0286196 | A1 | 10/2015 | Acosta Gonzalez | |
| 2015/0293505 | A1 | 10/2015 | Acosta Gonzalez | |
| 2015/0345804 | A1 * | 12/2015 | Ellingwood | F24H 15/34 700/282 |
| 2016/0105022 | A1 | 4/2016 | Oehring et al. | |
| 2017/0122326 | A1 | 5/2017 | Dahlqvist et al. | |

FOREIGN PATENT DOCUMENTS

| | | | | |
|---|---|---|---|---|
| CN | 2434454 | Y * | 6/2001 | |
| CN | 102384533 | A | 3/2012 | |
| CN | 104871107 | A | 8/2015 | |
| CN | 104932377 | A | 9/2015 | |
| EP | 0464355 | B1 | 12/1993 | |
| EP | 0464360 | B1 | 11/1994 | |
| EP | 0735273 | A1 | 10/1996 | |
| EP | 0864755 | B1 | 8/2003 | |
| EP | 1614903 | A1 | 1/2006 | |
| EP | 2143953 | B1 | 6/2011 | |
| EP | 2142802 | B1 * | 8/2014 | F04B 45/00 |
| EP | 2354555 | B1 | 12/2015 | |
| FR | 2075830 | A5 | 10/1971 | |
| FR | 2075830 | A5 * | 10/1971 | |
| FR | 2105733 | A5 | 4/1972 | |
| GB | 1563172 | A | 3/1980 | |
| WO | WO2013067206 | A1 | 5/2013 | |
| WO | WO2014089694 | A1 | 6/2014 | |

OTHER PUBLICATIONS

International Search Report and Written Opinion dated Oct. 2, 2017, for PCT/CA2017/050648.
Armstrong: Series 4302; Vertical In-Line Dualarm Split-Coupled; 3x3x6 Submittal; Dec. 4, 2014.
Armstrong; Series 4302; Vertical In-Line Dualarm Split-Coupled; 3x3x8 Submittal; Dec. 4, 2014.
Armstrong; Series 4302; Vertical In-Line Dualarm Split-Coupled; 4x4x6 Submittal; Dec. 4, 2014.
Armstrong; Series 4302; Vertical In-Line Dualarm Split-Coupled; 4x4x8 Submittal; Dec. 4, 2014.
Armstrong; Series 4302; Vertical In-Line Dualarm Split-Coupled; 6x6x6 Submittal; Dec. 4, 2014.
Armstrong; Series 4302; Vertical In-Line Dualarm Split-Coupled; 6x6x8 Submittal; Dec. 4, 2014.
Armstrong; Series 4302; Vertical In-Line Dualarm Split-Coupled; 8x8x8 Submittal; Dec. 4, 2014.
Armstrong; Series 4392; Vertical In-Line Pump Brochure; 2010.
PumpsUK description webpage of Armstrong 4392 pump (https://www.pumpsukltd.com/armstrong-4392-express-pib-fixed-speed-in-line-pumps.html, availability dated Sep. 21, 2016.
Wilo-CronoTwin-DL-E pump brochure from 2013 accessible at https://iprowater.com/wp-content/uploads/2020/05/WILO-CRONO-LINE-BLOC-TWIN-E.pdf.
Lowara FCTS4 pump brochure from 2012 accessible at https://fortek.eu/wp-content/uploads/2016/11/fcfct-td-en.pdf.
Wilo SE, Pioneering for You: Wilo-CronoLine-IL, Wilo-CronoTwin-DL, Wilo-CronoBloc-BL, Jul. 2018, 128 pages.
Description of Non-Patent Literature, Wilo SE, Pioneering for You: Wilo-CronoLine-IL, Wilo-CronoTwin-DL, Wilo-CronoBloc-BL, Jul. 2018, 1 page.
Office Action dated Sep. 27, 2022, for European Application No. 17894573.9-1004, 7 pages.

* cited by examiner

FIGURE 16D
Commissioning
Pump will run
at factory settings
OK
Commissioning
Configure sensor 2
Low limit
High limit
Commissioning
Configure sensor 1
Low limit
High limit
Trends: Logged trend data
User level access
Settings synonymous with setup?
information
Commissioning
Sensor quantity
0
2
Motor Power 0.45 KW
VFD Freq. 58 Hz
Flow 30 USgpm
Head 35 PSI
Analog Input 2.73 V
Commissioning
Modbus IP
MAC Address
Baudrate
Device Instance
Commissioning

1800

DUAL BODY VARIABLE DUTY PERFORMANCE OPTIMIZING PUMP UNIT

CROSS-REFERENCE TO RELATED APPLICATIONS

This application is a continuation of U.S. patent application Ser. No. 16/461,274 filed May 17, 2019 entitled DUAL BODY VARIABLE DUTY PERFORMANCE OPTIMIZING PUMP UNIT, which granted as U.S. Pat. No. 11,732,719 on Aug. 22, 2023, which is a U.S. nationalization under 35 U.S.C. § 371 of International Application No. PCT/CA2017/050648 filed May 29, 2017 entitled DUAL BODY VARIABLE DUTY PERFORMANCE OPTIMIZING PUMP UNIT, which claims the benefit of priority to U.S. Provisional Patent Application No. 62/451,219 filed Jan. 27, 2017, all the contents of which are herein incorporated by reference.

TECHNICAL FIELD

Some example embodiments relate to circulating devices, and at least some example embodiments relate specifically to variable control intelligent pumps.

BACKGROUND

Pumps can be used in a variety of applications, including industrial processes, meaning a process that outputs product(s) (e.g. hot water, air) using inputs (e.g. cold water, fuel, air, etc.), Heating, ventilation and air conditioning (HVAC) systems, and water supply.

Some pump units are designed with two pumps in one unit, sometimes referred to as twin heads or dual heads. In some such units, the two pumps are designed to rotate in the same rotational direction. However, this can result in asymmetry in physical design and asymmetry in flow profiles.

Some pump systems require a keypad or keyboard input for setup, configuration and maintenance, which can be prone to sealing problems. Some other pump systems may require a separate mobile handheld device for setup, configuration and maintenance.

Additional difficulties with existing systems may be appreciated in view of the Detailed Description of Example Embodiments, herein below.

SUMMARY

Example embodiments relate to pumps, boosters and fans, centrifugal machines, and related systems. In accordance with some aspects, there is provided an intelligent multiple circulating pump unit having multiple pumps and with co-ordinated control of its pumps.

An example embodiment includes a dual pump unit having a pair of pumps that provide parallel hydraulic paths that operate concurrently in opposite rotational directions.

An example embodiment is a pump unit, including: a casing including a suction flange and a discharge flange; a first pump impeller within the casing; a second pump impeller within the casing and provides a parallel hydraulic path to the first pump impeller; wherein the first pump impeller is configured to concurrently rotate in opposite rotational direction to the second pump impeller.

Another example embodiment is a pump unit, including: a casing including a suction flange and a discharge flange; a first pump within the casing; a second pump within the casing and provides a parallel hydraulic path to the first pump impeller; a first touchscreen mounted on the casing for input and/or output in association with the first pump; and a second touchscreen mounted on the casing for input and/or output in association with the second pump.

Another example embodiment is a pump unit casing, including: a casing including a suction flange and a discharge flange; and a suction bay defined by the casing having a flattened bottom and hydraulically fed from the suction flange.

Another example embodiment is a method for operating a multiple pump unit, the pump unit including a casing including a suction flange and a discharge flange, a first pump impeller within the casing, and a second pump impeller within the casing and provides a parallel hydraulic path to the first pump impeller. The method includes: rotating the first pump impeller in a rotation direction to effect flow between the suction flange and the discharge flange; and concurrently rotating the second pump impeller in a counter rotation direction to effect flow between the suction flange and the discharge flange.

Another example embodiment is an integrated pump unit, including: a casing; a pump within the casing; a controller for controlling operation of the pump; and a touchscreen configured for input and/or output communication to the controller.

Another example embodiment is a non-transitory computer readable medium having instructions stored thereon executable by one or more processors for performing the described methods.

BRIEF DESCRIPTION OF THE DRAWINGS

Embodiments will now be described, by way of example only, with reference to the attached Figures, wherein.

Like reference numerals may be used throughout the Figures to denote similar elements and features.

DETAILED DESCRIPTION OF EXAMPLE EMBODIMENTS

In some example embodiments, there is provided an intelligent multiple pump unit for an operable system such as a flow control system or temperature control system. Example embodiments relate to “processes” in the industrial sense, meaning a process that outputs product(s) (e.g. hot water, air) using inputs (e.g. cold water, fuel, air, etc.).

An example embodiment includes a dual pump unit having a pair of pumps that provide parallel hydraulic paths that operate concurrently in opposite rotational directions.

An example embodiment includes a dual pump unit having a casing which includes a suction flange and a discharge flange, and a pair of pumps that are radially inline and that provide parallel hydraulic paths within the casing, that operate concurrently in opposite rotational directions.

An example embodiment includes a dual pump unit having a pair of pumps that provide parallel hydraulic paths, wherein each pump includes a touchscreen for configuration of the respective pump.

An example embodiment includes a pump unit casing having a suction flange and a discharge flange, a first suction bay defined by the casing having a first flattened bottom and hydraulically fed from the suction flange, and a second suction bay defined by the casing having a second flattened bottom and hydraulically fed from the suction flange and provides a parallel hydraulic path to the first suction bay.

An example embodiment includes a dual pump unit which controls operation of a plurality of its sensorless pumps in a co-ordinated manner. For example, in some embodiments the system may be configured to operate without external sensors to collectively control output properties (variables) to source a load.

Figure 9:
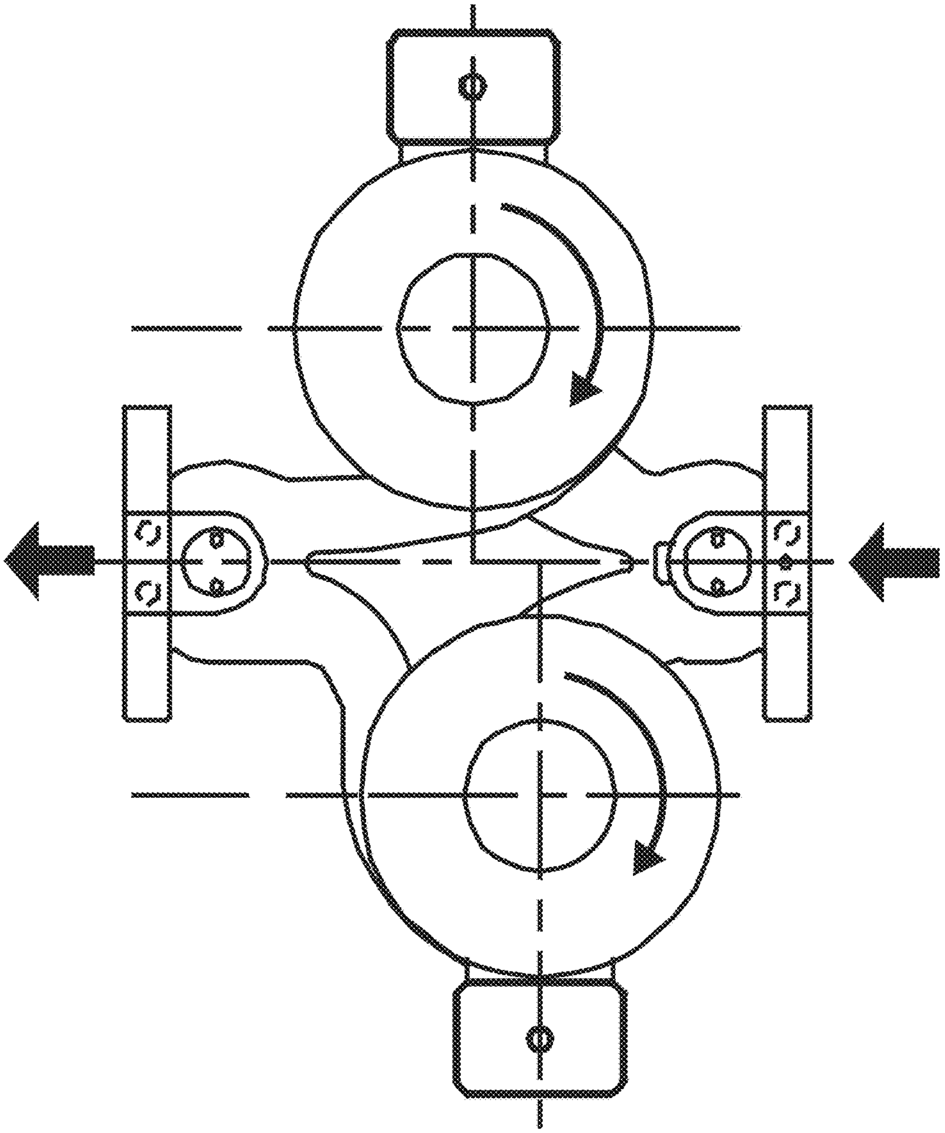
PRIOR ART FIGURE 9
FIG. 9 illustrates a diagrammatic top view of an example prior art twin head pump design illustrating same rotational direction configuration.

FIG. 9 illustrates a prior art pump unit which is designed with two pumps in one unit. As shown in FIG. 9, the two pumps are designed to rotate in the same rotational direction. However, this can result in asymmetry in physical design and asymmetry in flow profiles.

Figure 1:
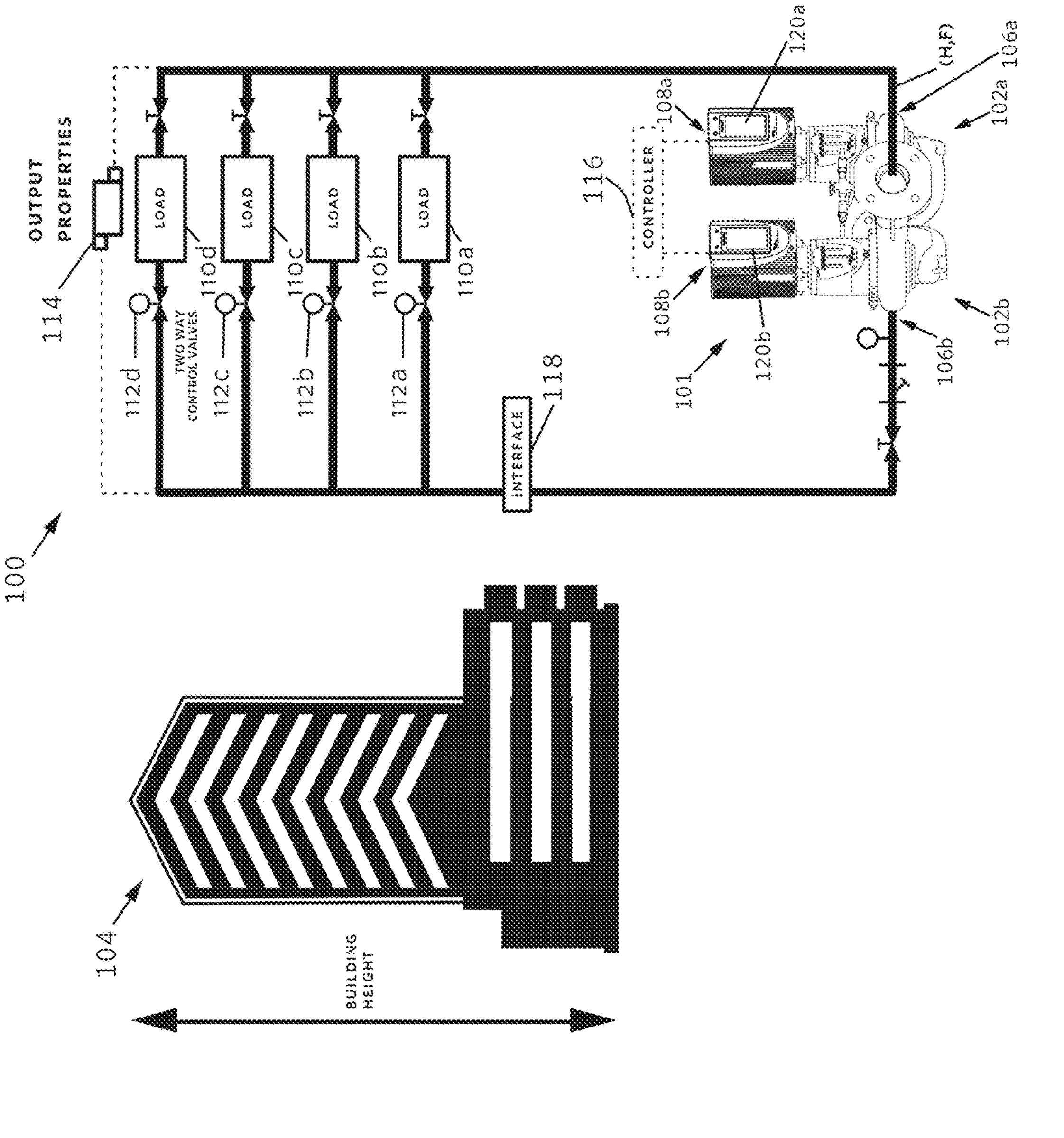
FIG. 1 illustrates an example block diagram of a circulating system illustrating an intelligent dual control pump unit, to which example embodiments may be applied.

Reference is made to FIG. 1 which shows in block diagram form a circulating system 100 to which example embodiments may be applied, having an intelligent dual pump unit 101, which itself comprises intelligent variable speed circulating devices such as control pumps 102*a*, 102*b* (collectively or individually referred to as 102). The circulating system 100 may relate to a building 104 (as shown), a campus (multiple buildings), vehicle, or other suitable infrastructure or load. Each control pump 102 may include one or more respective pump devices 106*a*, 106*b* (collectively or individually referred to as 106) and a control device 108*a*, 108*b* (collectively or individually referred to as 108) for controlling operation of each pump device 106. The particular circulating medium may vary depending on the particular application, and may for example include glycol, water, air, and the like.

As illustrated in FIG. 1, the circulating system 100 may include one or more loads 110*a*, 110*b*, 110*c*, 110*d*, wherein each load may be a varying usage requirement based on HVAC, plumbing, etc. Each 2-way valve 112*a*, 112*b*, 112*c*, 112*d* may be used to manage the flow rate to each respective load 110*a*, 110*b*, 110*c*, 110*d*. As the differential pressure across the load decreases, the control device 108 responds to this change by increasing the pump speed of the pump device 106 to maintain or achieve the pressure setpoint. If the differential pressure across the load increases, the control device 108 responds to this change by decreasing the pump speed of the pump device 106 to maintain or achieve the pressure setpoint. In some example embodiments, the control valves 112*a*, 112*b*, 112*c*, 112*d* can include faucets or taps for controlling flow to plumbing systems. In some example embodiments, the pressure setpoint can be fixed, continually or periodically calculated, externally determined, or otherwise specified.

The control device 108 for each control pump 102 may include an internal detector or sensor, typically referred to in the art as a "sensorless" control pump because an external sensor is not required. The internal detector may be configured to self-detect, for example, device properties (device variables) such as the power and speed of the pump device 106. In some example embodiments, an external sensor is used to detect the local head output and flow output (H, F). Other input variables may be detected. The pump speed of the pump device 106 may be varied to achieve a pressure and flow setpoint of the pump device 106 in dependence of the input variables.

Referring still to FIG. 1, the output properties of each control device 102 are controlled to, for example, achieve a pressure setpoint at the combined output properties 114, shown at a load point of the building 104. The output properties 114 represent the aggregate or total of the individual output properties of all of the control pumps 102 at the load, in this case, flow and pressure. In an example embodiment, an external sensor (not shown) may be placed at the location of the output properties 114 and associated controls may be used to control or vary the pump speed of the pump device 106 to achieve a pressure setpoint in dependence of the detected flow by the external sensor. In another example embodiment, the output properties 114 are instead inferred or correlated from the self-detected device properties, such as the power and speed of the pump devices 106, and/or other input variables. As shown, the output properties 114 are located at the most extreme load position at the height of the building 104 (or end of the line), and in other example embodiments may be located in other positions such as the middle of the building 104, ⅔ from the top of the building 104 or down the line, or at the farthest building of a campus.

One or more controllers 116 (e.g. processors) may be used to co-ordinate the output flow of the control pumps 102. As shown, the control pumps 102 may be arranged in parallel with respect to the flow path in order to source shared loads 110*a*, 110*b*, 110*c*, 110*d*.

In some examples, the circulating system 100 may be a chilled circulating system ("chiller plant"). The chiller plant may include an interface 118 in thermal communication with a secondary circulating system for the building 104. The control valves 112*a*, 112*b*, 112*c*, 112*d* manage the flow rate to the cooling coils (e.g., load 110*a*, 110*b*, 110*c*, 110*d*). Each 2-way valve 112*a*, 112*b*, 112*c*, 112*d* may be used to manage the flow rate to each respective load 110*a*, 110*b*, 110*c*, 110*d*. As a valve 112*a*, 112*b*, 112*c*, 112*d* opens, the differential pressure across the valve decreases. The control device 108 responds to this change by increasing the pump speed of the pump device 106 to achieve a specified output setpoint. If a control valve 112*a*, 112*b*, 112*c*, 112*d* closes, the differential pressure across the valve increases, and the control devices 108 respond to this change by decreasing the pump speed of the pump device 106 to achieve a specified output setpoint.

In some other examples, the circulating system 100 may be a heating circulating system ("heating plant"). The heater plant may include an interface 118 in thermal communication with a secondary circulating system for the building 104. In such examples, the control valves 112*a*, 112*b*, 112*c*, 112*d* manage the flow rate to heating elements (e.g., load 110*a*, 110*b*, 110*c*, 110*d*). The control devices 108 respond to changes in the heating elements by increasing or decreasing the pump speed of the pump device 106 to achieve the specified output setpoint.

Figure 10A:
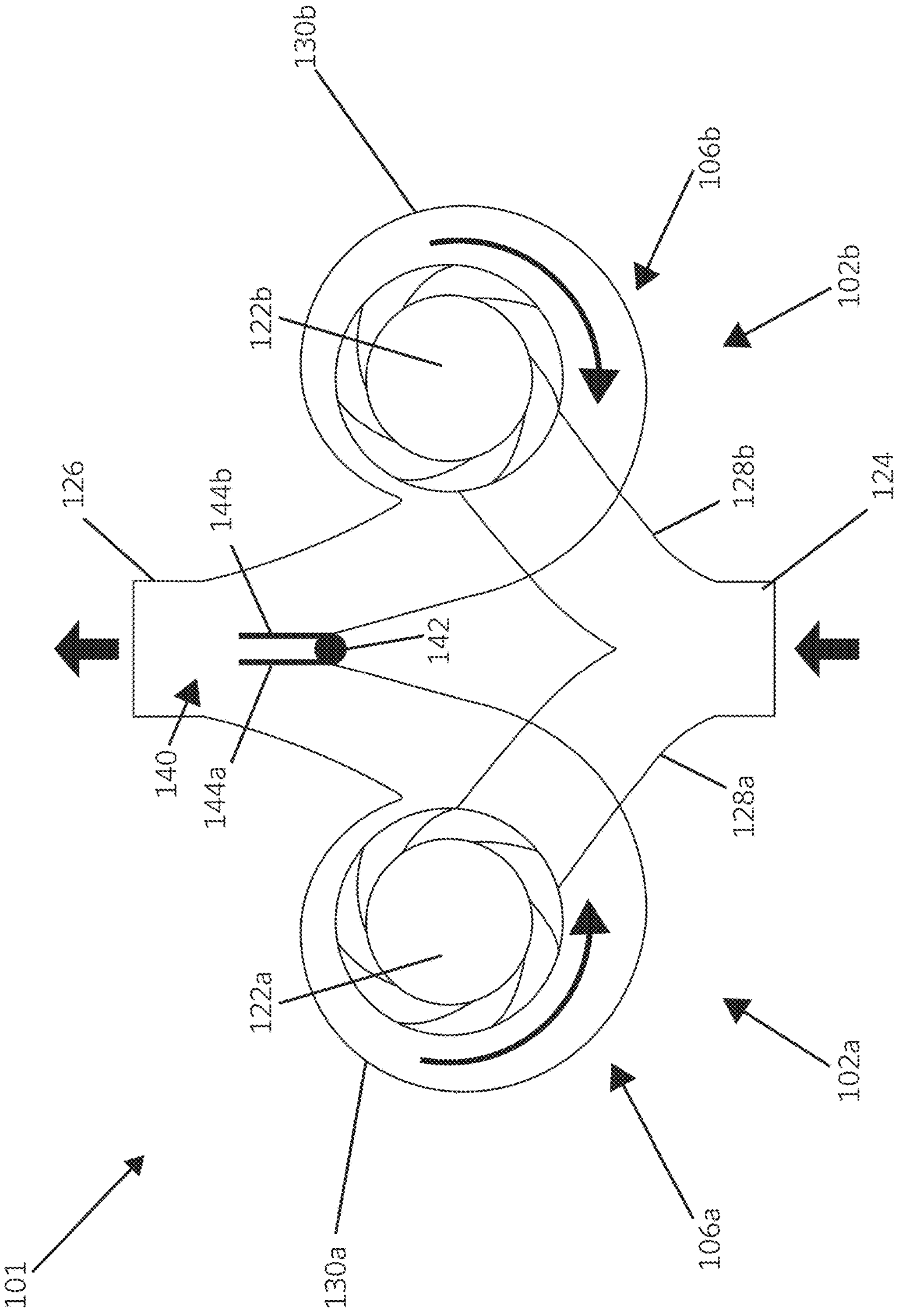
FIG. 10A illustrates a diagrammatic top view of an intelligent dual pump unit having two pumps in counter rotation configuration, and illustrating dual pump operation, in accordance with an example embodiment.
Figure 10C:
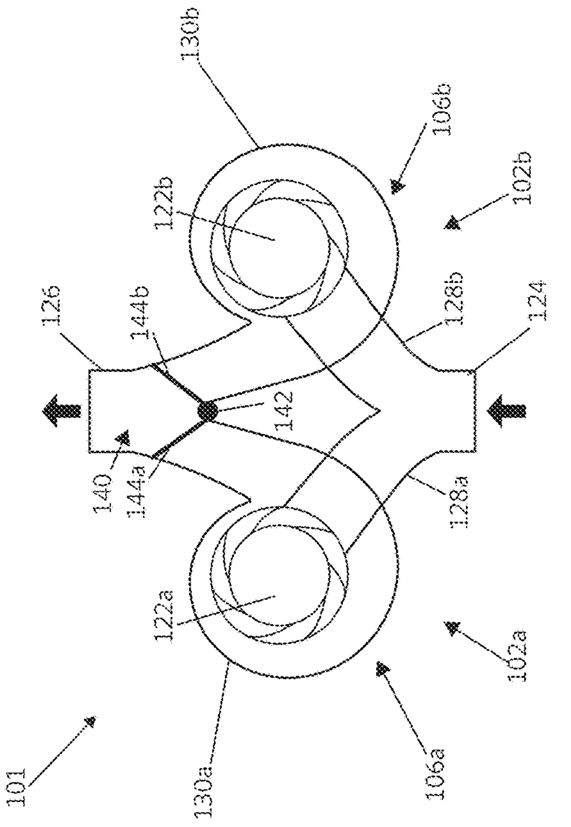
FIG. 10C illustrates a diagrammatic top view of an intelligent dual pump unit of FIG. 10A, illustrating non-operation, in accordance with an example embodiment.
Figure 10B:
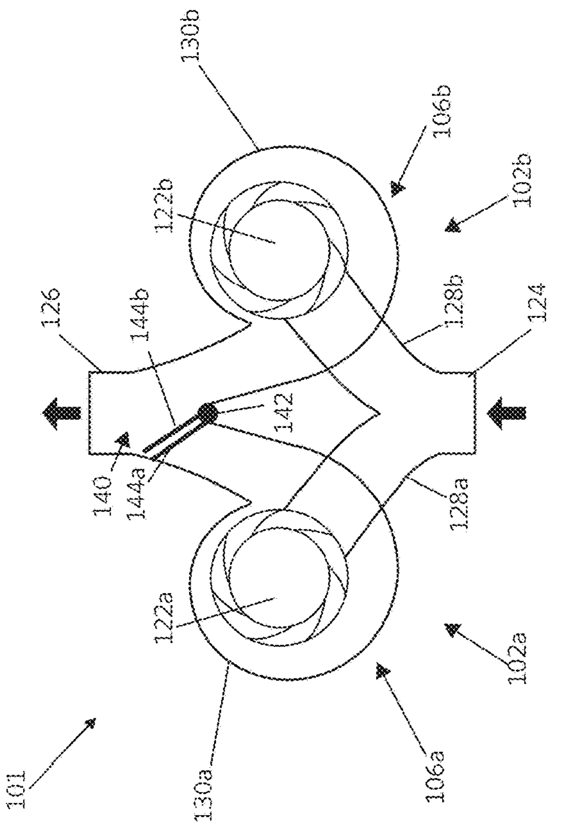
FIG. 10B illustrates a diagrammatic top view of the intelligent dual pump unit of FIG. 10A, illustrating single pump operation, in accordance with an example embodiment.

Each pump device 106 may take on various forms of pumps which have variable speed control. FIGS. 10A, 10B and 10C illustrate a diagrammatic top view of the intelligent dual pump unit 101, having the two control pumps 102*a*, 102*b* in counter rotation configuration, in accordance with an example embodiment. The pump unit 101 includes first pump impeller 122*a* and second pump impeller 122*b*. The pump impellers 122*a*, 122*b* are in parallel, meaning they are configured to effect separate parallel hydraulic flow paths within the pump unit 101. In an example embodiment, the pump impellers 122*a*, 122*b* are positioned radially inline (as opposed to axially inline). In an example embodiment, the pump impellers 122*a*, 122*b* are positioned horizontally inline, for example they are horizontally aligned during pre-installation, installation and use. Thicker arrows represent flow lines of a circulating medium.

The intelligent dual pump unit 101 includes a sealed casing which houses the pump device 106, which includes a suction flange 124 for connecting to a line for receiving a circulating medium, and a discharge flange 126 for connecting to a line for outputting of the circulating medium. Each control pump 102*a*, 102*b* includes a respective suction bay 128*a*, 128*b*. A respective volute 130*a*, 130*b* fed from the respective suction bay 128*a*, 128*b* is used for housing of the respective pump impeller 122*a*, 122*b*. A respective variable motor, not shown here, can be variably controlled from the control device 108*a*, 108*b* to rotate at variable speeds. Each control pump 102*a*, 102*b* may further include a respective touchscreen 120*a*, 12*b* for interaction, input and/or output, between the user and the respective control device 108*a*, 108*b*. The pump impeller 122*a*, 122*b* is operably coupled to the motor and spins based on the speed of the motor, to circulate the circulating medium. In an example embodiment, the first control device 108*a* and the second control device 108*b* are configured to control the respective pump impeller 122*a*, 122*b* in a range of 0% to 100% of motor speed. The control of both pumps 122*a*, 122*b* can be performed symmetrically or asymmetrically. In other example embodiments, other suitable ranges can be a range narrower than between 0% to 100%, depending on desired or system operation ranges.

Each control pump 102*a*, 102*b* may further include additional suitable operable elements or features, depending on the type of pump device 106. Each volute 130*a*, 130*b* can be configured to receives the circulating medium being pumped by the respective pump impeller 122*a*, 122*b*, slowing down the fluid's rate of flow. Each volute 130*a*, 130*b* can comprise a curved funnel that increases in area as it approaches the discharge flange 126.

In an example embodiment, the casing of the pump unit 101 is substantially symmetrical in shape and dimension. This facilitates ease of design and manufacturing. This also facilitates balance in operation and centralizing the centre of gravity. Further, for example, each of the control pumps 102*a*, 102*b* can be controlled to operate concurrently. The pump impellers 122*a*, 122*b* are co-ordinated so that combined output achieves a setpoint. In an example embodiment, the control pumps 102*a*, 102*b* are controlled at the same motor speed. When the casing is substantially symmetrical, then same motor speeds results in substantially equal contribution effected onto the circulating medium by each of the control pumps 102*a*, 102*b*.

Figure 11:
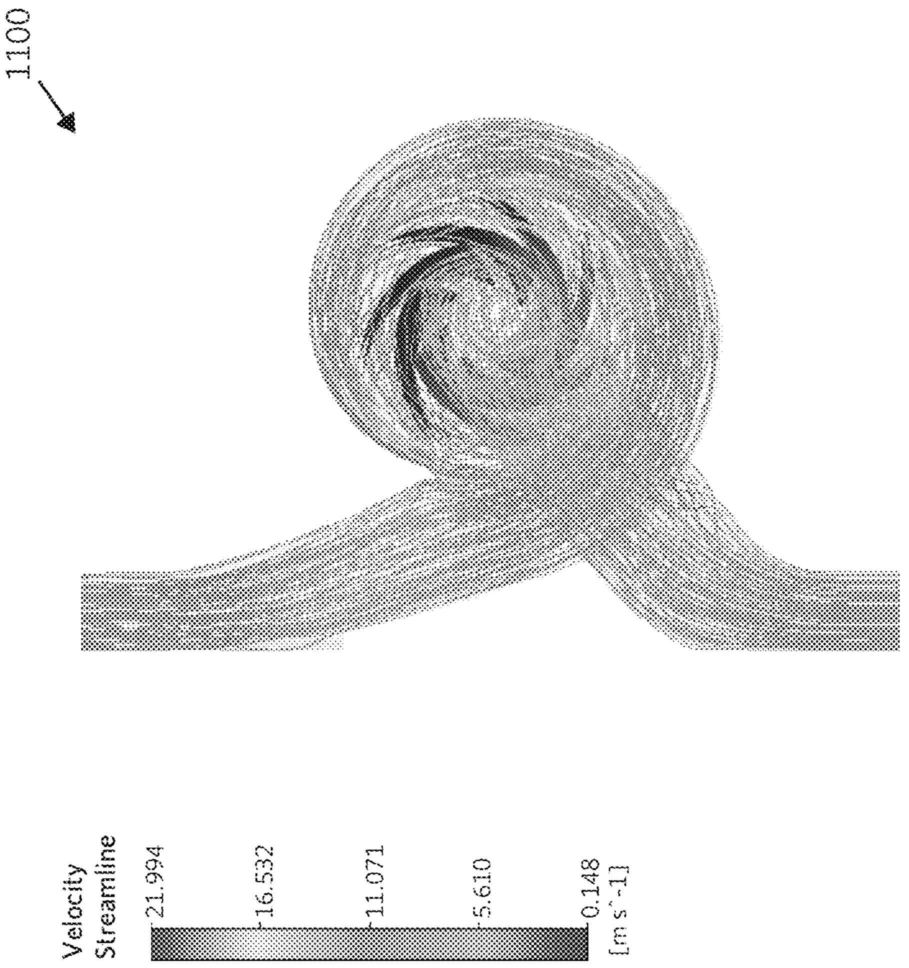
FIG. 11 illustrates a graph of velocity streamlines of one of the pumps of the intelligent dual pump unit of FIG. 10A, the other pump having opposite substantially identical streamlines thereto.

FIG. 11 illustrates a graph 1100 of velocity streamlines of one of the control pump 102*b*. It can be appreciated that the other control pump 102*a* has the opposite and substantially identical streamlines thereto. Accordingly, for example, symmetrical and predictable performance of each control pump 102*a*, 102*b* can be more readily implemented since the control pumps 102*a*, 102*b* can have the same output variables as a result of operation of the same device variables. When the motors of the control pumps 102*a*, 102*b* operate at the same speed, this results in the same contribution of flow from each control pump 102*a*, 102*b*, to achieve an output pressure setpoint, for example. Referring briefly to FIG. 1, if an external sensor is placed at the output properties 114, the motor speed of each control pump 102*a*, 102*b* can be increased equally until the desired output pressure setpoint at the output properties 114 is achieved. This contrasts with the prior art system illustrated in FIG. 9, which can have non-symmetrical operation. The prior art system of FIG. 9 may require additional calibration to determine the individual contributions, and requires different motor speeds to achieve the same output variable.

A flap valve 140 of the pump unit 101 will now be described, referring to FIGS. 10A, 10B and 10C. FIG. 10A illustrates concurrent dual pump operation, in accordance with an example embodiment. FIG. 10B illustrates single pump operation, in accordance with an example embodiment. FIG. 10C illustrates non-operation of the pumps, in accordance with an example embodiment. The flap valve 140 is configured as a back pressure activated flow prevention flap device that has a physical design that enables parallel operation, dual operation (symmetric or asymmetric), and single pump operation.

The flap valve 140 includes a spring hinge 142, a first flap 144*a* and a second flap 144*b* connected to the spring hinge. The spring hinge 142 is configured and biased so that each flap 144*a*, 144*b* is normally closed, as in FIG. 10C. This prevents backflow. As shown in FIG. 10A, when both pumps 102*a*, 102*b* are operating at the same speed, symmetrical operation can be effected so that each flap 144*a*, 144*b* is open. As shown in FIG. 10B, when only one control pump 102 is in operation, the first flap 144*a* is closed and the second flap 144*b* is fully open towards the first flap 144*a*. Asymmetric flows between the control pumps 102*a*, 102*b* result in the flaps 144*a*, 144*b* being more or less open, accordingly. In another example embodiment, more than one spring hinge 142 may be used, for example one respective spring hinge for each flap 144*a*, 144*b*. In another example embodiment, other types of valves are used.

In an example embodiment, the pump impellers 122*a*, 122*b* are controlled to rotate concurrently at different speeds. In an example embodiment, the pump impellers 122*a*, 122*b* are controlled to rotate at less than the maximum motor capacity (speed). As variable motors can have optimal efficiency at less than maximum speed, energy efficiencies may be gained in some example implementations. In an example embodiment, the pump impellers 122*a*, 122*b* may be controlled to distribute wear between the respective control pumps 102*a*, 102*b*. For example, if one control pump 102*a* is inactive for a duration, the subsequent use of that control pump 102*a* can be increased so that the wear is distributed. In an example embodiment, the control devices 108*a*, 108*b* are further configured to operate the pump impellers 122*a*, 122*b* as duty-standby, in another mode of operation. For example, in such a mode, one primary pump 108*a* may designated as the primary pump source ("duty"), while a secondary pump can be used as backup ("standby") when the primary pump is not available.

Figure 12:
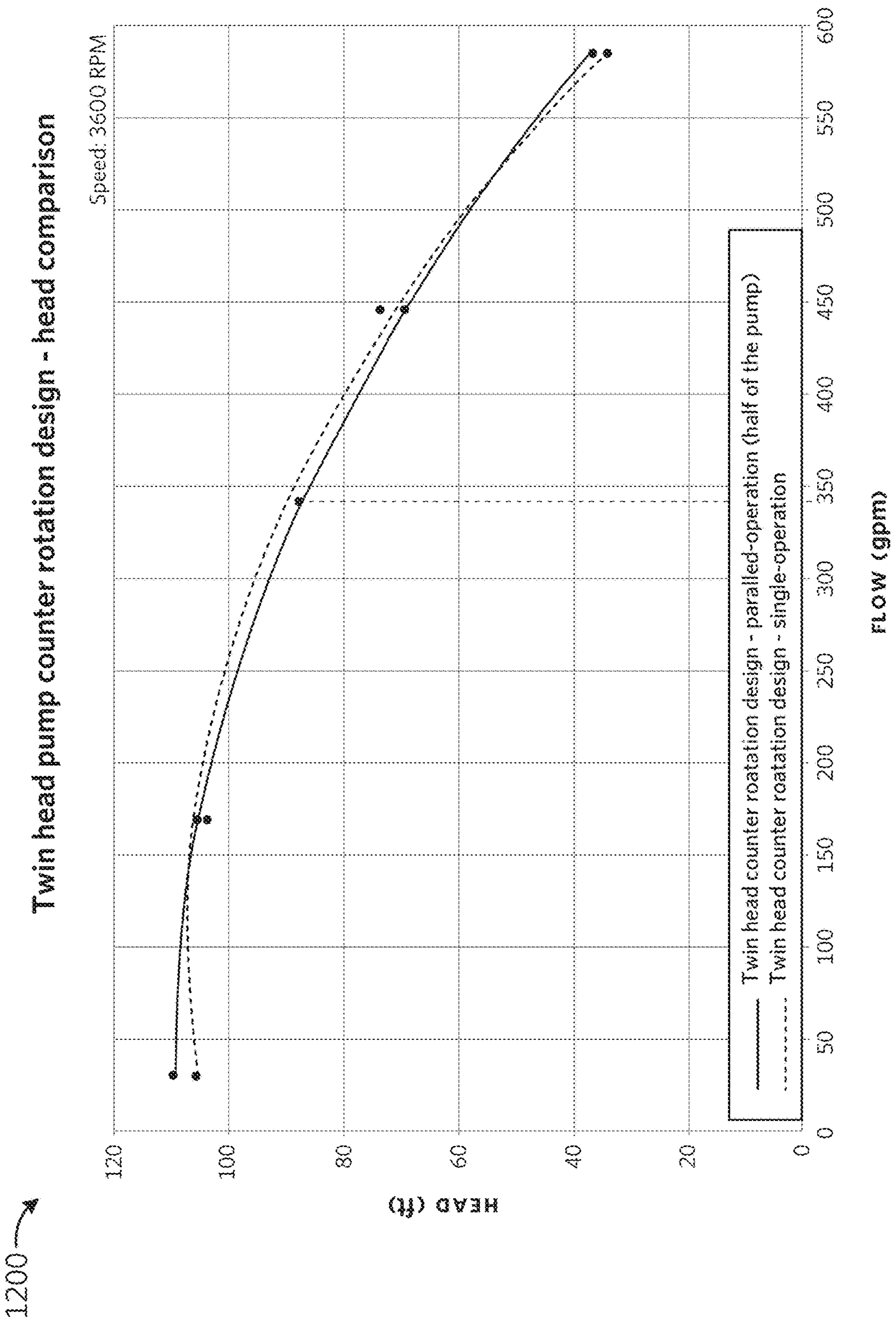
FIG. 12 illustrates a pump curve graph illustrating the intelligent dual pump unit in dual operation, as in FIG. 10A, versus the dual pump unit in single operation, as in FIG. 10B.

FIG. 12 illustrates a pump curve graph 1200 illustrating the intelligent dual pump unit in dual operation, as in FIG. 10A, versus the dual pump unit in single operation, as in FIG. 10B. As can be seen on the graph 1200, the effective head versus flow can be substantially matched when both pumps 102*a*, 102*b* are operating, when compared to a single pump 102*b* of the dual pump unit 101 being used. In the dual pump case, the pump motors are not required to operate at maximum speed, which can be more energy efficient.

Figure 13B:
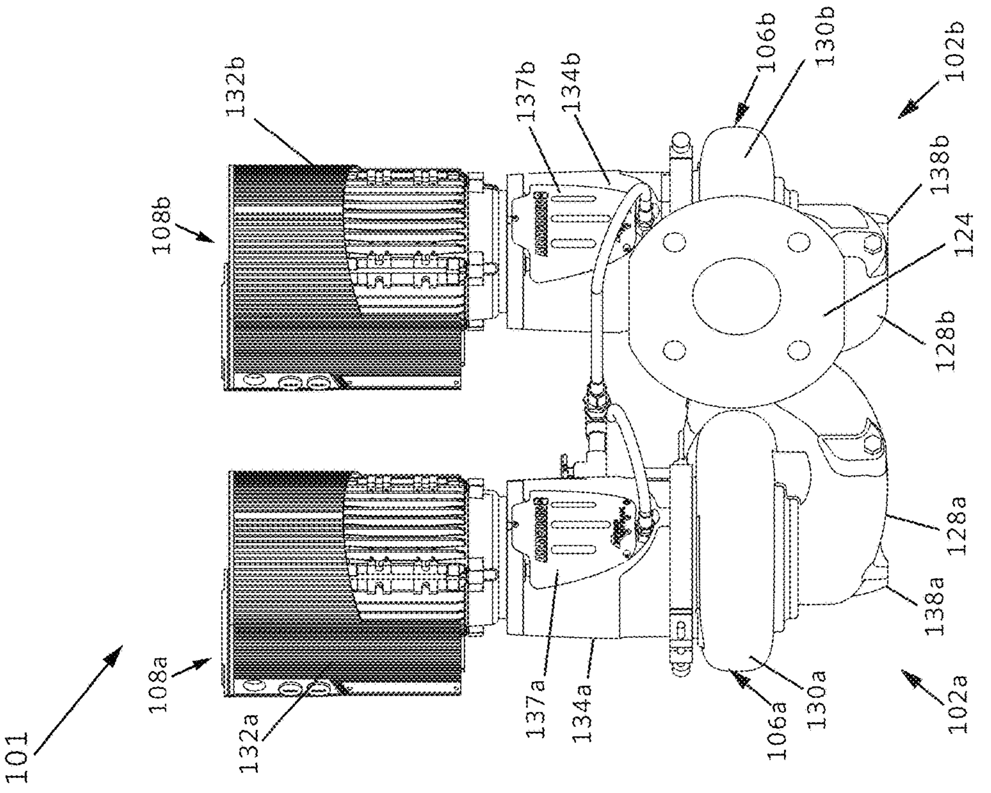
FIG. 13B illustrates a rear perspective view of the intelligent dual pump unit of FIG. 13A.
Figure 13A:
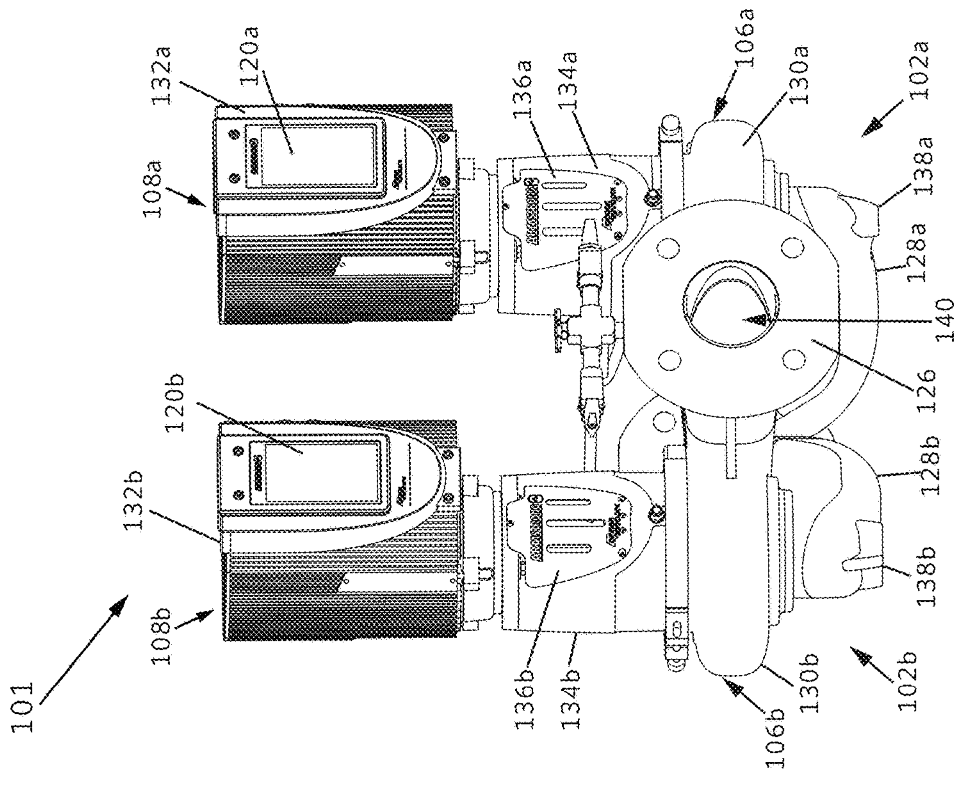
FIG. 13A illustrates a front perspective view of an example intelligent dual pump unit, in a split-coupled configuration, in accordance with an example embodiment.
Figure 13C:
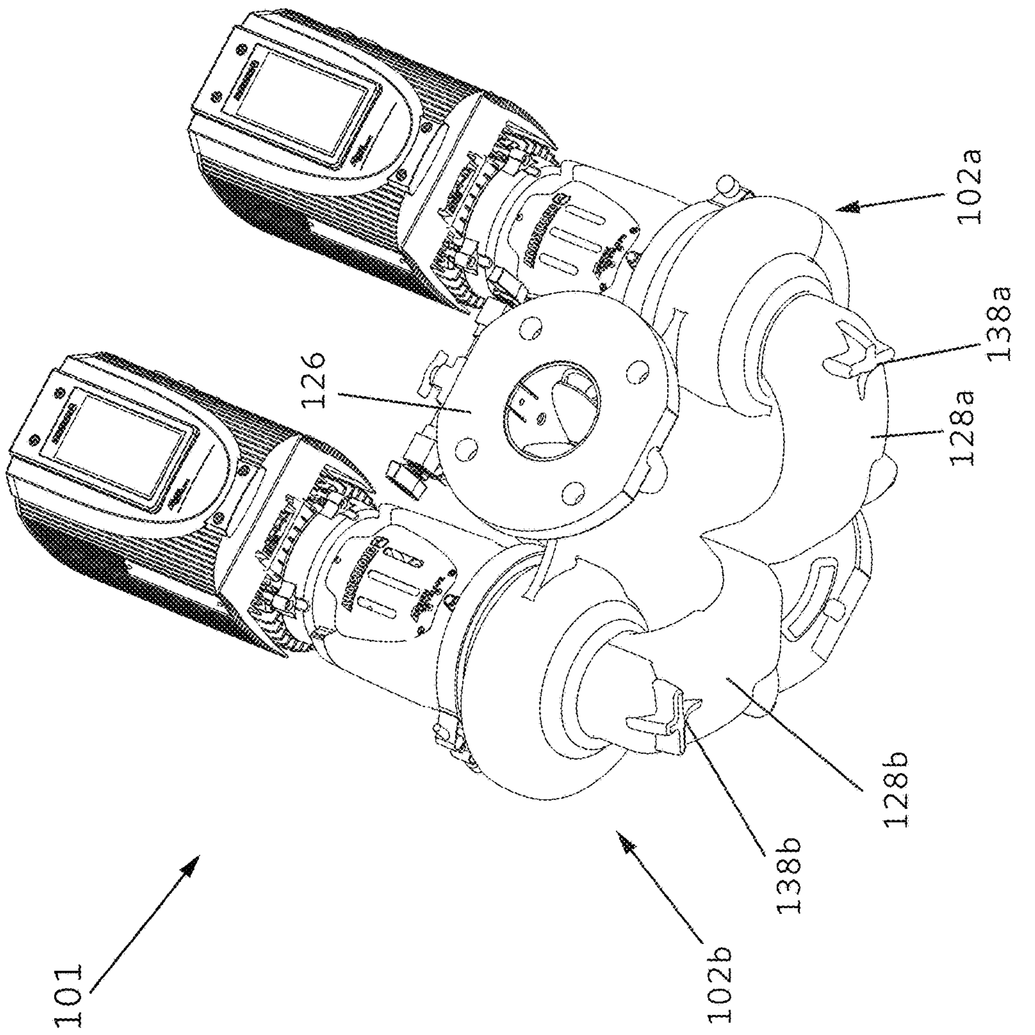
FIG. 13C illustrates a bottom perspective view of the intelligent dual pump unit of FIG. 13A.

Reference is now briefly made to FIGS. 13A, 13B and 13C which illustrates additional detail of the pump unit 101. The casing of the pump unit 101 further includes a motor casing 132*a*, 132*b* for housing of the respective controller 108*a*, 108*b*, and for housing of the respective variable pump motor (not shown). The casing of the pump unit 101 further includes a pedestal casing 134*a*, 134*b*, which houses a respective shaft(s) between the respective pump motor and the respective pump impeller 122*a*, 122*b*. Additional seals, elements and components (not shown) can be housed in the motor casing 132*a*, 132*b* and/or the pedestal casing 134*a*, 134*b*.

FIG. 13C illustrates a bottom perspective view of the intelligent dual pump unit 101, illustrating a flattened bottom. In an example embodiment, each suction bay 128*a*, 128*b* includes a respective exterior flange 138*a*, 138*b* which each has a flattened bottom. As shown, each exterior flange 138*a*, 138*b* can have a "cross" shape that defines a flat surface. For example, both exterior flanges 138*a*, 138*b* provide two flat regions of contact so that the pump unit 101 can stand on its own on a flat surface, for example during setup and installation of the pump unit 101. The flattened bottoms of each exterior flange 138*a*, 138*b* are horizontally aligned when the pump unit 101 is vertically oriented, so that they collectively provide a flat surface. For example the flattened bottom can enable the pump unit 101 to stand up-right during assembly, packaging, and/or installation processes. In an example embodiment, the exterior flange 138*a*, 138*b* is integrally formed and unitary with the respective suction bay 128*a*, 128*b*, for example during casting or moulding.

Still referring to FIGS. 13A, 13B and 13C, the pump unit 101 can be configured to as a vertical inline split-coupled unit. Vertical inline can refer to the pump motor, shaft(s) and impeller 122*a*, 122*b* being generally vertically inline. The connection between the pump motor and respective pump impeller 122*a*, 122*b* can be split into two separate shafts, and further includes a pump seal (not shown). In an example embodiment, this connection is axially split, and a spacer type rigid coupling permits seal maintenance without disturbing the pump impeller 122*a*, 122*b* and/or pump motor. For example, each pedestal casing 134*a*, 134*b* can include at least one respective removable cover 136*a*, 136*b*. As shown, there is a front removable cover 136*a*, 136*b* and a rear removable cover 137*a*, 137*b*. When the cover 136*a*, 136*b*, 137*a*, 137*b* is removed, the seal (not shown) for each pump motor within the pedestal casing 134*a*, 134*b* can be replaced without removing the respective pump motor, for example.

Figure 14B:
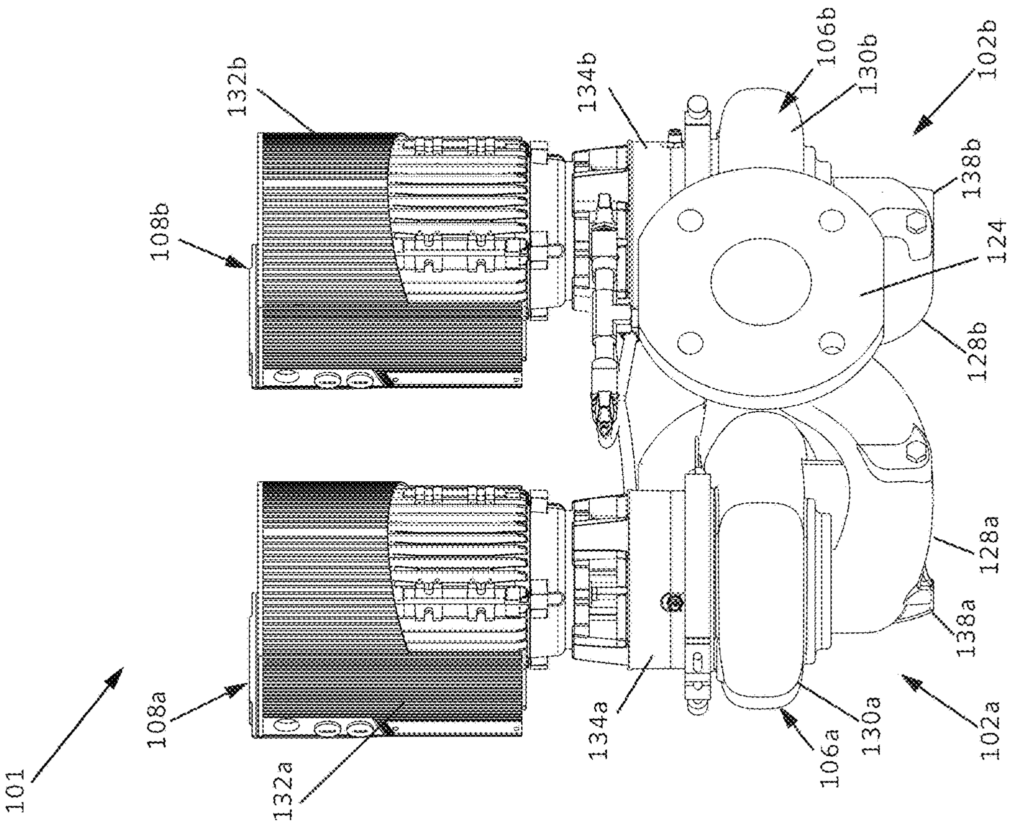
FIG. 14B illustrates a rear perspective view of the example intelligent dual pump unit of FIG. 14A.
Figure 14A:
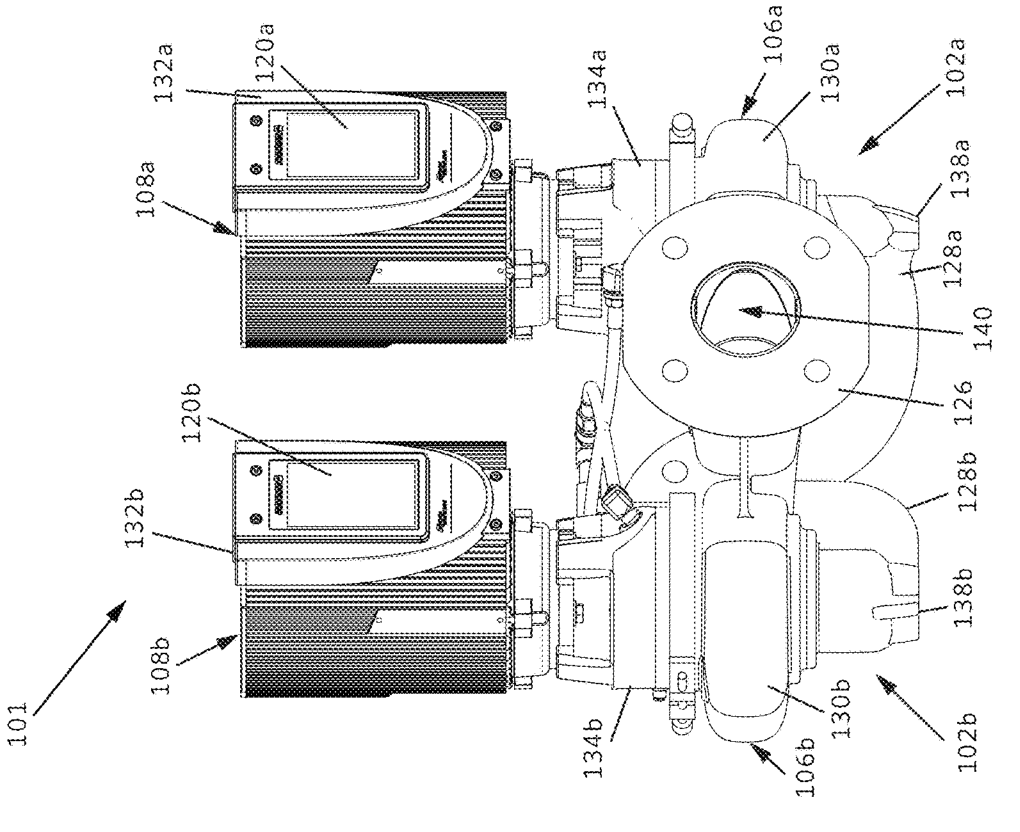
FIG. 14A illustrates a front perspective view of an example intelligent dual pump unit, in a closed-coupled configuration, in accordance with an example embodiment.

Reference is now made to FIGS. 14A and 14B, which illustrate the pump unit 101 in a closed-coupled configuration, in accordance with an example embodiment. Similar reference numbers are used for convenience of reference. Closed-coupled refers to a single shaft for connecting the pump motor to the pump impeller 122*a*, 122*b*. The single shaft is housed in the respective pedestal casing 134*a*, 134*b*. Accordingly there is no removable cover 136*a*, 136*b*, 137*a*, 137*b* on the respective pedestal casing 134*a*, 134*b* (as in FIG. 13A), since no seal maintenance or other maintenance is performed without removing the entire motor, for example. On the other hand, for example, less components and vertical space is required in the closed-coupled configuration, and a single shaft can provide a stronger connection.

FIGS. 16A, 16B, 16C and 16D illustrate screenshots for each of (or any one of) the touchscreens 120*a*, 120*b* of the control pumps, in accordance with example embodiments. The touchscreen 120*a*, 120*b* can be used to effect a user interface, such as input and/or output, to the respective controller 108*a*, 108*b*. In an example embodiment, as shown in the screenshots, the touchscreen 120*a*, 120*b* can be configured to facilitate setup and/or commissioning of the respective controller 108*a*, 108*b* for the respective control pump 102*a*, 102*b*.

Figure 15:
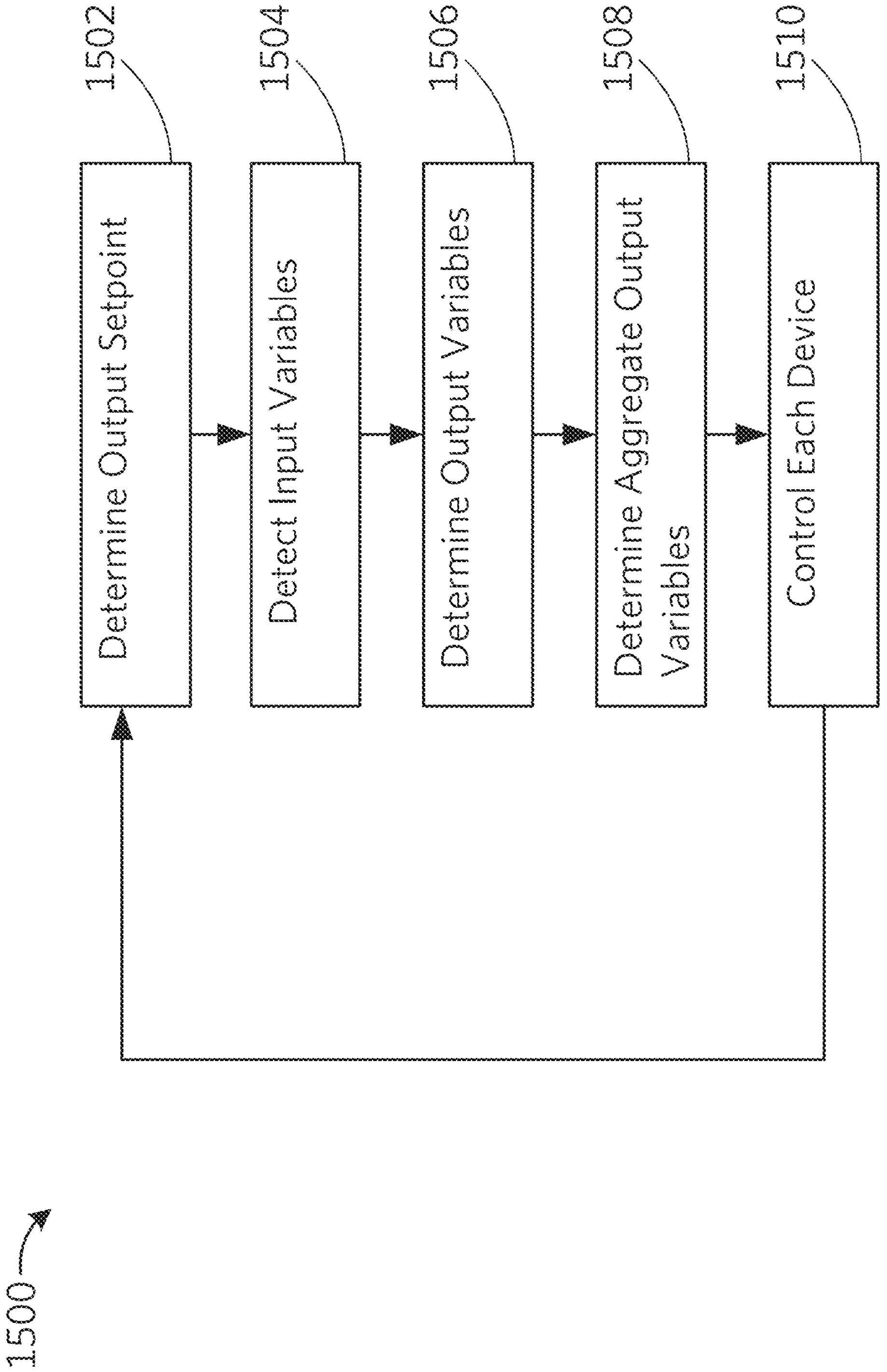
FIG. 15 illustrates a flow diagram of a method for operating a multiple pump unit, in accordance with an example embodiment.
Figure 16A:
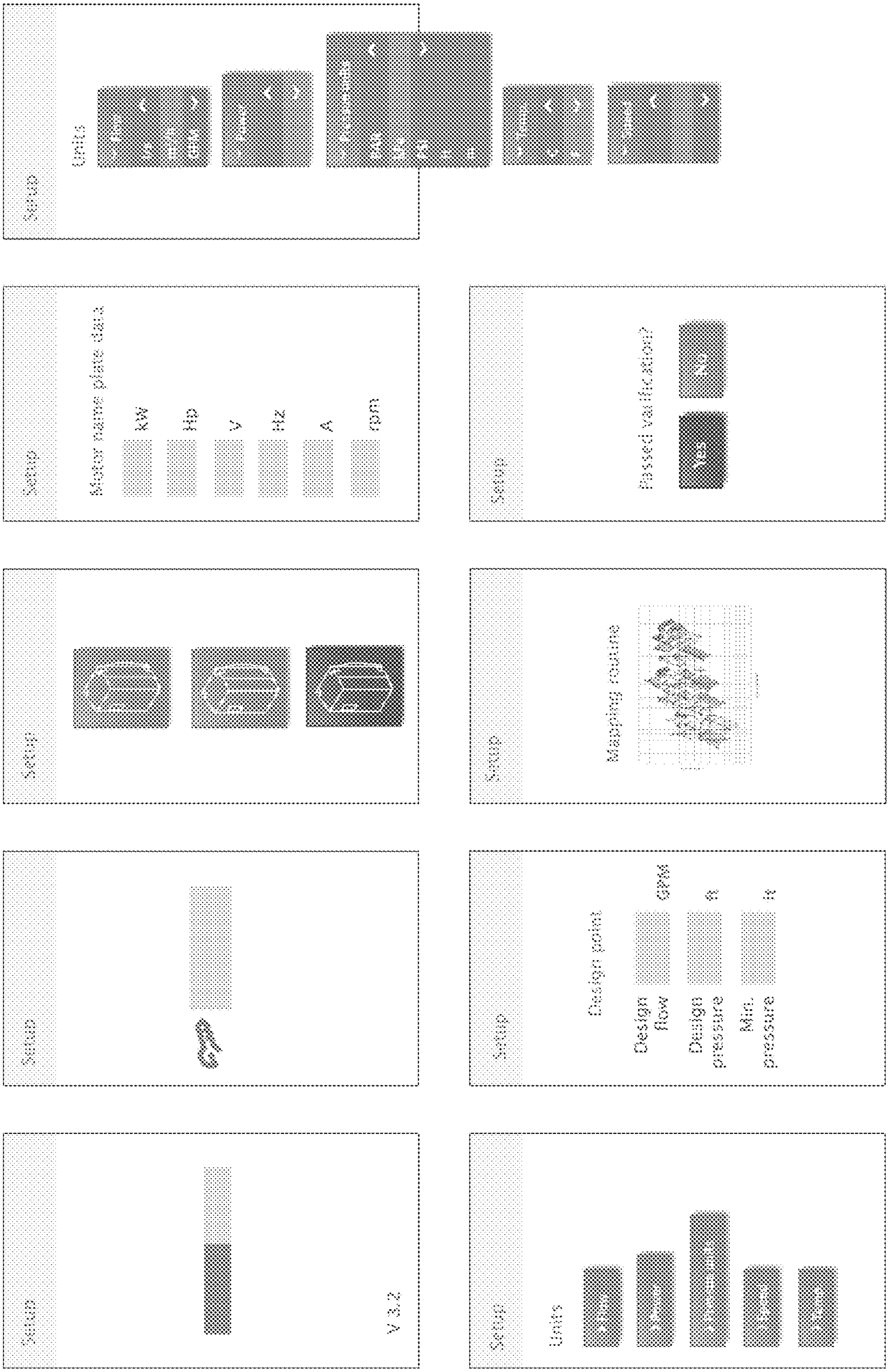
FIGS. 16A, 16B, 16C and 16D illustrate screenshots for a touchscreen of the control pumps, in accordance with some example embodiments.
Figure 16B:
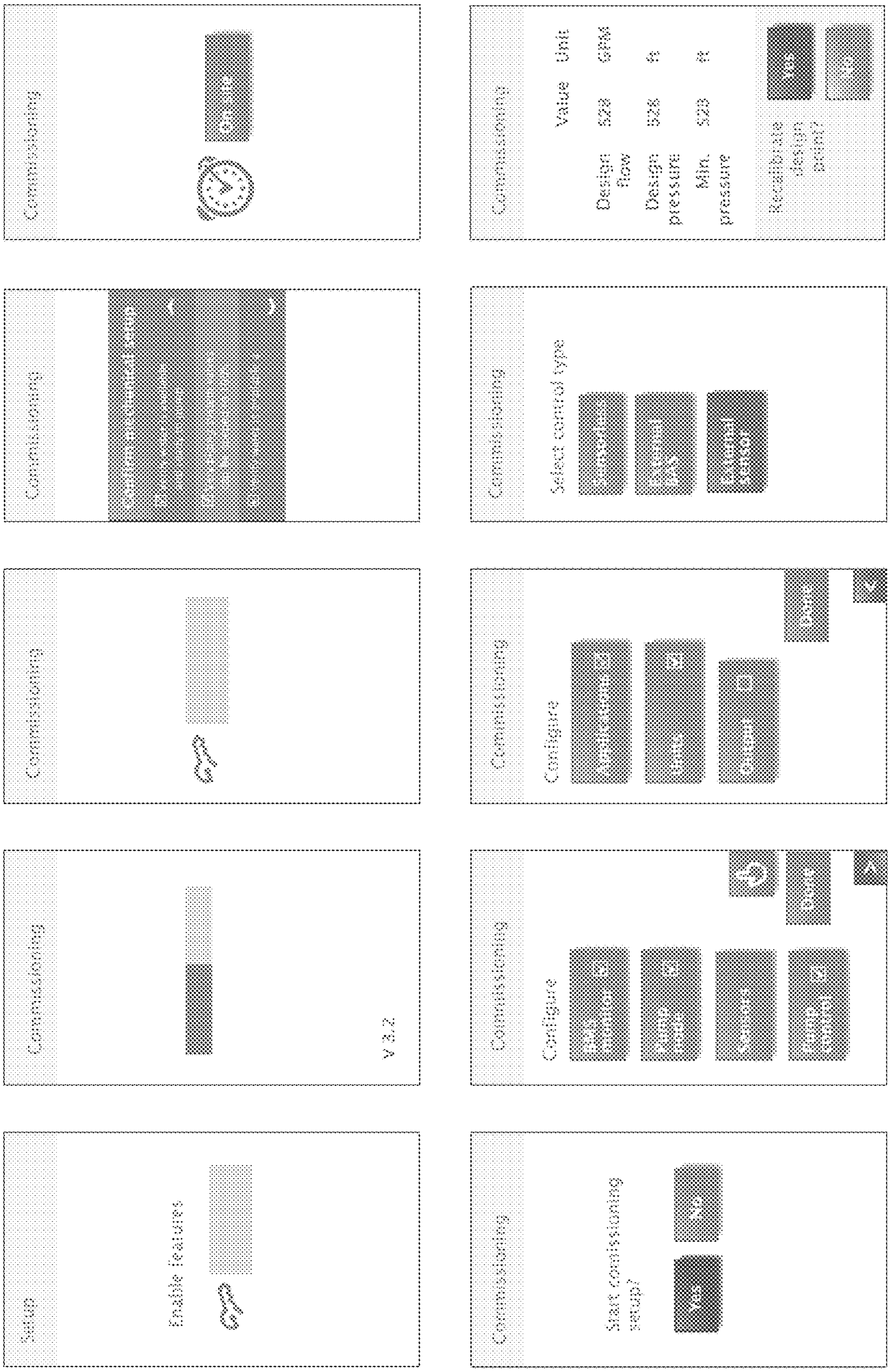
Figure 16C:
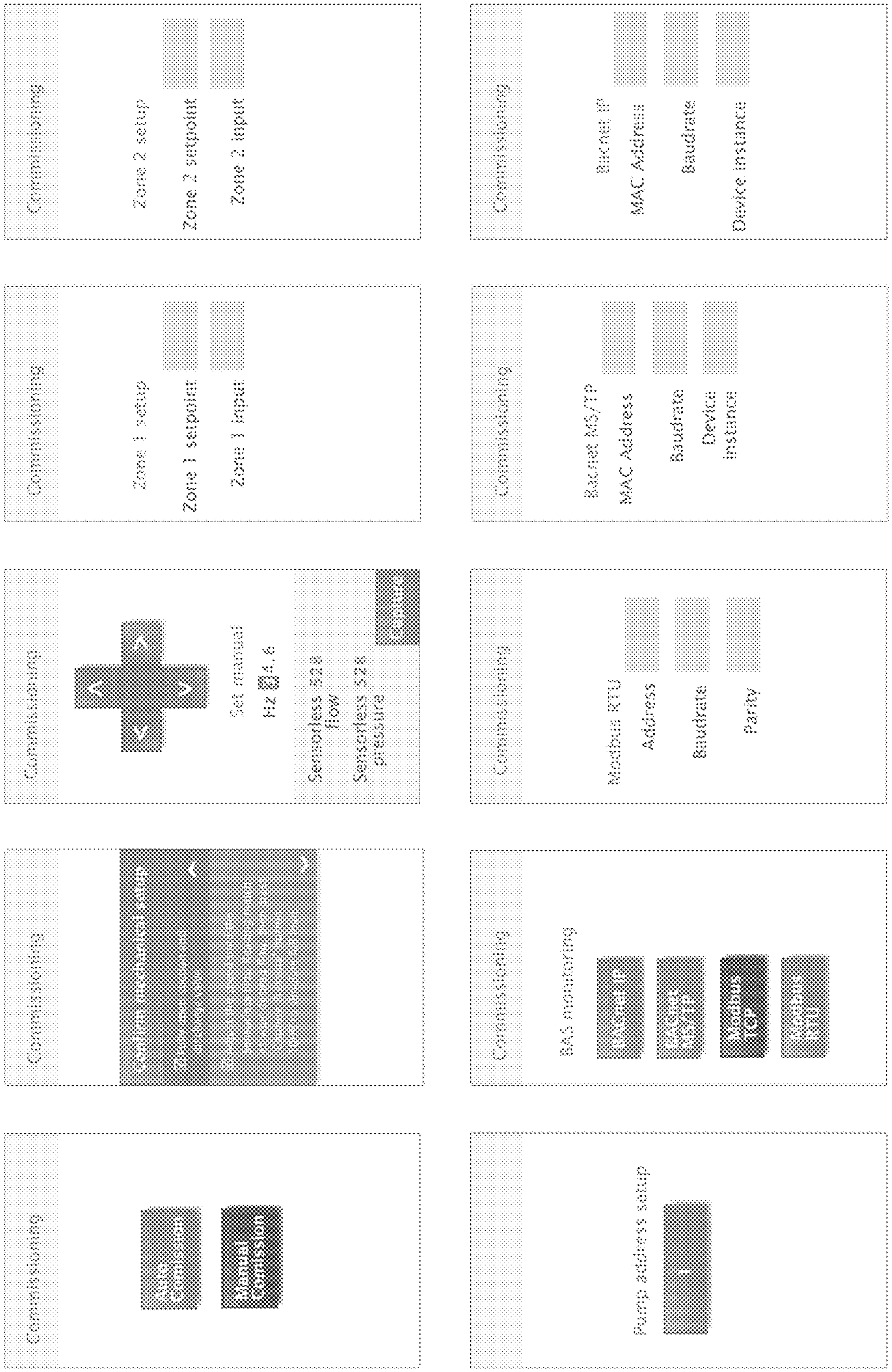
Figure 16D:

FIG. 15 illustrates a flow diagram of a method 1500 for operating the dual pump unit 101, in accordance with an example embodiment. Aspects or events of the method 1500 can be performed by at least one or all of the controllers 108*a*, 108*b*, 116, as applicable. The method 1500 can be automated in that manual control would not be required.

At event 1502, the method 1500 includes determining the desired output setpoint, for example the pressure setpoint of the system 100 (FIG. 1). In some example embodiments, the pressure setpoint can be fixed, continually or periodically calculated, externally determined, or otherwise specified.

At event 1504, the method 1500 includes detecting inputs including variable such as system variables or device variables of each device (e.g., each control pump 102*a*, 102*b*). At event 1506, the method 800 includes determining the one or more output properties (output variables) of each device. This can be directly detected or inferred from the device properties (device variables). The respective one or more output properties can be calculated to determine the individual contributions of each device to the system load point. At event 1508, the method 1500 includes determining the aggregate output properties (output variables) to the load from the individual one or more output properties. At event 1510, the method includes co-ordinating control of each of the devices to operate the respective controllable element (e.g. pump impeller 122*a*, 122*b*), resulting in one or more device variables to achieve the respective one or more output properties to achieve the setpoint. This includes rotating the first pump impeller 122*a* in a rotation direction to effect flow between the suction flange and the discharge flange, and concurrently rotating the second pump impeller 122*b* in a counter rotation direction to effect flow between the suction flange and the discharge flange. The method 1500 may be repeated, for example, as indicated by the feedback loop.

In an example embodiment, the pump impellers 122*a*, 122*b* are controllable to concurrently rotate at an equal speed. Due to the symmetrical casing of the pump unit 101, equal motor speed results in equal flow output contribution by each of the pump impellers 122*a*, 122*b*. The hydraulic characteristics of the casing and each pump impeller 122*a*, 122*b* therefore provide hydraulically identical net flow and head pressure upon identical speed rotation of each pump impeller 122*a*, 122*b*. Equal and opposite flow paths result from each pump impeller 122*a*, 122*b* in such a case. In an example embodiment, the pump impellers 122*a*, 122*b* are controllable to concurrently rotate at different speeds. In an example embodiment, the pump impellers 122*a*, 122*b* are controllable to rotate at less than maximum speed of each respective pump motor.

Figure 2:
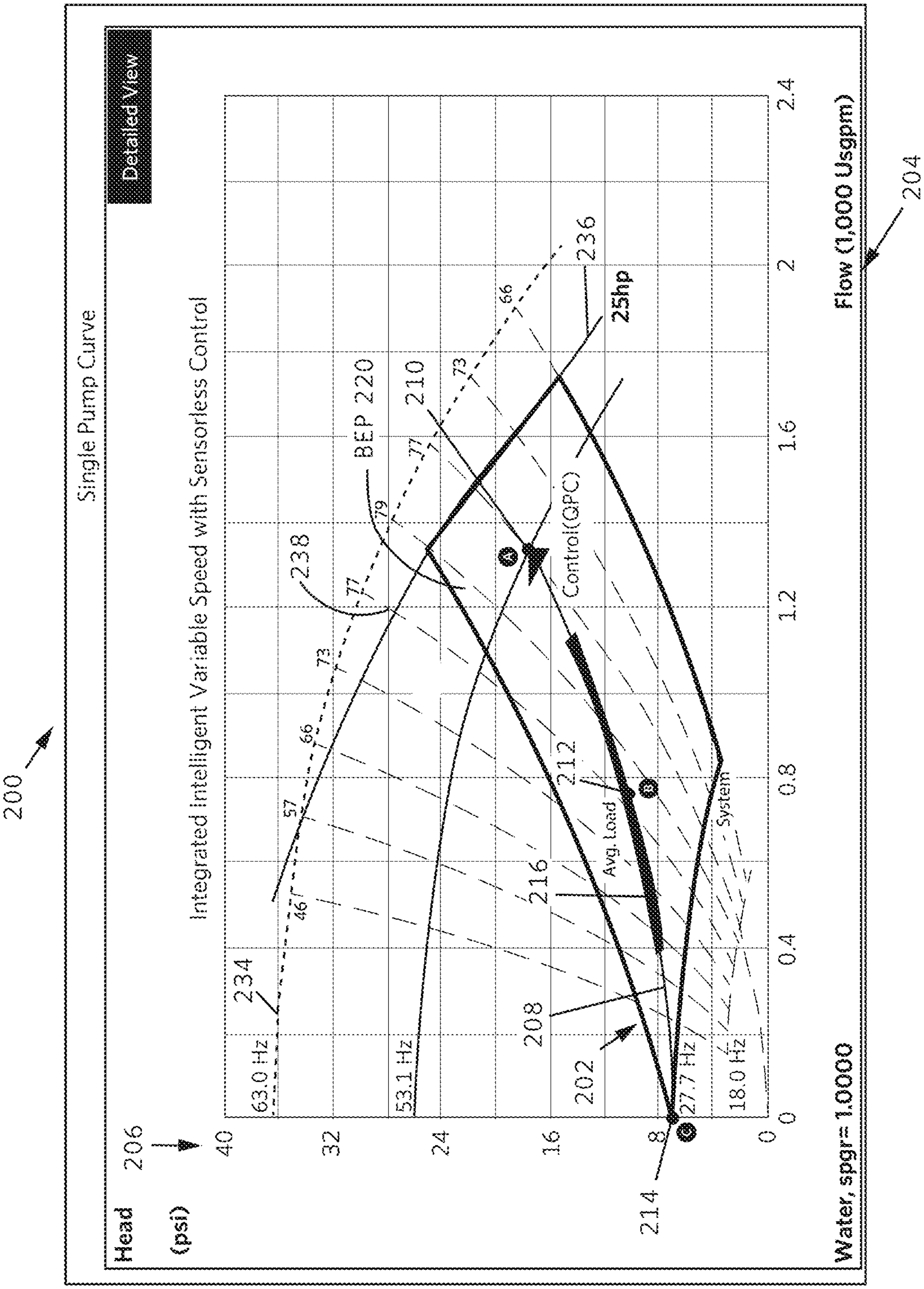
FIG. 2 illustrates an example range of operation of a variable speed control pump.

Reference is now made to FIG. 2, which illustrates a graph 200 showing an example suitable range of operation 202 for a variable speed device, in this example the control pump 102. The range of operation 202 is illustrated as a polygon-shaped region or area on the graph 200, wherein the region is bounded by a border represents a suitable range of operation. For example, a design point may be, e.g., a maximum expected system load as in point A (210) as required by a system such as a building 104 at the output properties 114 (FIG. 1).

The design point, Point A (210), can be estimated by the system designer based on the flow that will be required by a system for effective operation and the head/pressure loss required to pump the design flow through the system piping and fittings. Note that, as pump head estimates may be over-estimated, most systems will never reach the design pressure and will exceed the design flow and power. Other systems, where designers have under-estimated the required head, will operate at a higher pressure than the design point. For such a circumstance, one feature of properly selecting one or more intelligent variable speed pumps is that it can be properly adjusted to delivery more flow and head in the system than the designer specified.

The design point can also be estimated for operation with multiple controlled pumps 102, with the resulting flow requirements allocated between the controlled pumps 102. For example, for controlled pumps of equivalent type or performance, the total estimated required output properties 114 (e.g. the maximum flow to maintain a required pressure design point at that location of the load) of a system or building 104 may be divided equally between each controlled pump 102 to determine the individual design points, and to account for losses or any non-linear combined flow output. In other example embodiments, the total output properties (e.g. at least flow) may be divided unequally, depending on the particular flow capacities of each control pump 102, and to account for losses or any non-linear combined flow output. The individual design setpoint, as in point A (210), is thus determined for each individual control pump 102.

The graph 200 includes axes which include parameters which are correlated. For example, head squared is approximately proportional to flow, and flow is approximately proportional to speed. In the example shown, the abscissa or x-axis 204 illustrates flow in U.S. gallons per minute (GPM) (can be litres per minute) and the ordinate or y-axis 206 illustrates head (H) in pounds per square inch (psi) (alternatively in feet/meters or Pascals). The range of operation 202 is a superimposed representation of the control pump 102 with respect to those parameters, onto the graph 200.

The relationship between parameters may be approximated by particular affinity laws, which may be affected by volume, pressure, and Brake Horsepower (BHP) (e.g. in kilowatts). For example, for variations in impeller diameter, at constant speed: $D1/D2=Q1/Q2$; $H1/H2=D1^2/D2^2$; $BHP1/BHP2=D1^3/D2^3$. For example, for variations in speed, with constant impeller diameter: $S1/S2=Q1/Q2$; $H1/H2=S1^2/S2^2$; $BHP1/BHP2=S1^3/S2^3$. Wherein: D=Impeller Diameter (Ins/mm); H=Pump Head (Ft/m); Q=Pump Capacity (gpm/lps); S=Speed (rpm/rps); BHP=Brake Horsepower (Shaft Power—hp/kW).

Specifically, for the graph 200 at least some of the parameters there is more than one operation point or path of system variables of the operable system that can provide a given output setpoint. As is understood in the art, at least one system variable at an operation point or path restricts operation of another system variable at the operation point or path.

Also illustrated is a best efficiency point (BEP) curve 220 of the control pump 102. The partial efficiency curves are also illustrated, for example the 77% efficiency curve 238. In some example embodiments, an upper boundary of the range of operation 202 may also be further defined by a motor power curve 236 (e.g. maximum Watts or horsepower). In alternate embodiments, the boundary of the range of operation 202 may also be dependent on a pump speed curve 234 (shown in Hz) rather than a strict maximum motor power curve 236.

As shown in FIG. 2, one or more control curves 208 (one shown) may be defined and programmed for an intelligent variable speed device, such as the control pump 102. Depending on changes to the detected parameters (e.g. detected, internal or inferred detection of changes in flow/load), the operation of the pump device 106 may be maintained to operate on the control curve 208 based on instructions from the control device 108 (e.g. at a higher or lower flow point). This mode of control may also be referred to as quadratic pressure control (QPC), as the control curve 208 is a quadratic curve between two operating points (e.g., point A (210): maximum head, and point C (214): minimum head). Reference to "intelligent" devices herein includes the control pump 102 being able to self-adjust operation of the pump device 106 along the control curve 208, depending on the particular required or detected load.

Other example control curves other than quadratic curves include constant pressure control and proportional pressure control (sometimes referred to as straight-line control). Selection may also be made to another specified control curve (not shown), which may be either pre-determined or calculated in real-time, depending on the particular application.

Figure 4:
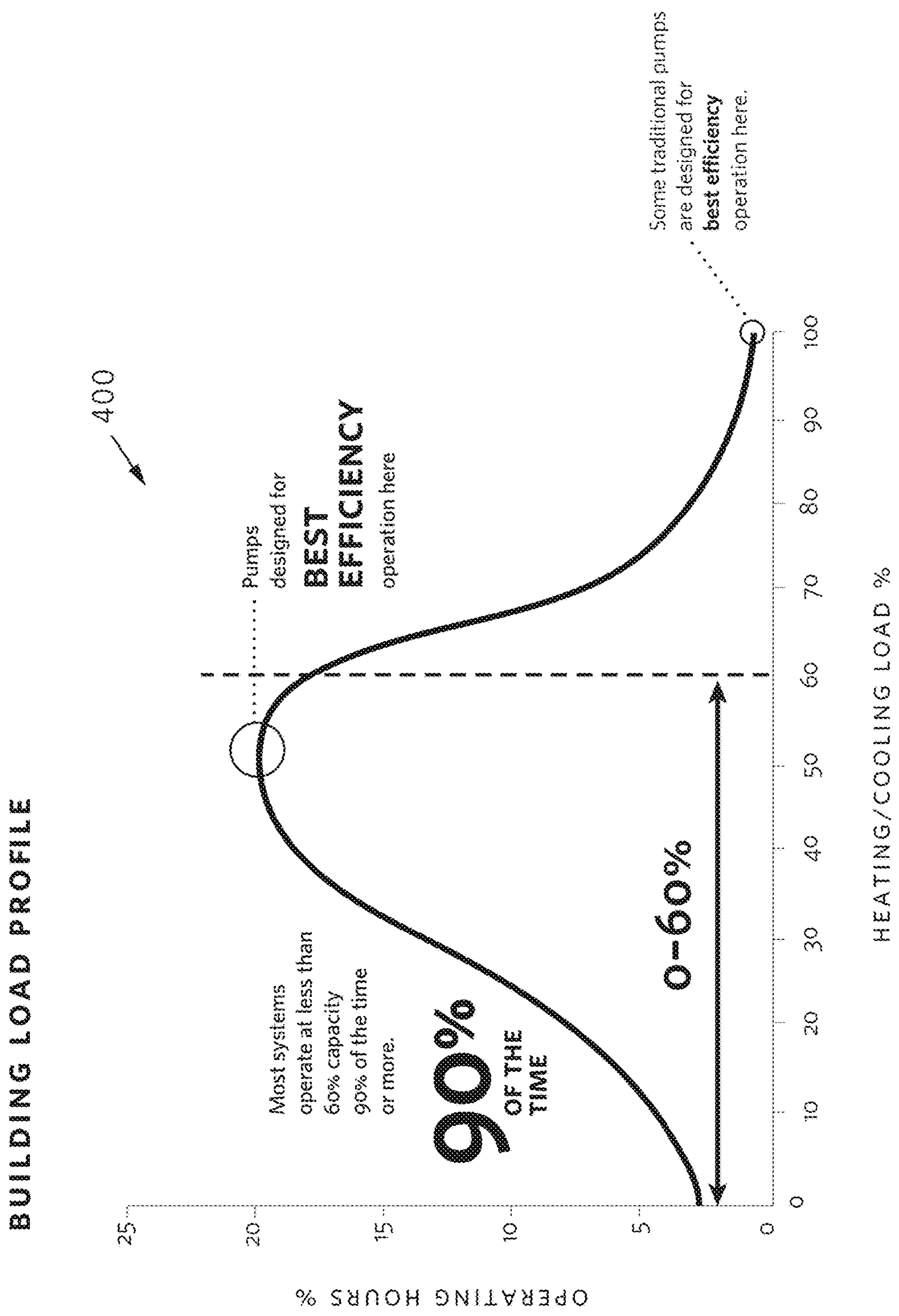
FIG. 4 illustrates an example load profile for a system such as a building.

FIG. 4 illustrates an example load profile 400 for a system such as a building 104, for example, for a projected or measured "design day". The load profile 400 illustrates the operating hours percentage versus the heating/cooling load percentage. For example, as shown, many example systems may require operation at only 0% to 60% load capacity 90% of the time or more. In some examples, a control pump 102 may be selected for best efficiency operation at partial load, for example on or about 50% of peak load. Note that, ASHRAE 90.1 standard for energy savings requires control of devices that will result in pump motor demand of no more than 30% of design wattage at 50% of design water flow (e.g. 70% energy savings at 50% of peak load). It is understand that the "design day" may not be limited to 24 hours, but can be determined for shorter or long system periods, such as one month, one year, or multiple years.

Referring again to FIG. 2, various points on the control curve 208 may be selected or identified or calculated based on the load profile 400 (FIG. 4), shown as point A (210), point B (212), and point C (214). For example, the points of the control curve 208 may be optimized for partial load rather than 100% load. For example, referring to point B (212), at 50% flow the efficiency conforms to ASHRAE 90.1 (greater than 70% energy savings). Point B (212) can be referred to as an optimal setpoint on the control curve 208, which has maximized efficiency on the control curve 208 for 50% load or the most frequent partial load. Point A (210) represents a design point which can be used for selection purposes for a particular system, and may represent a maximum expected load requirement of a given system. Note that, in some example embodiments, there may be actually increased efficiency at part load for point B versus point A. Point C (214) represents a minimum flow and head (Hmin), based on 40% of the full design head, as a default, for example. Other examples may use a different value, depending on the system requirements. The control curve 208 may also include an illustrated thicker portion 216 which represents a typical expected load range (e.g. on or about 90%-95% of a projected load range for a projected design day). Accordingly, the range of operation 202 may be optimized for partial load operation. In some example embodiments, the control curve 208 may be re-calculated or redefined based on changes to the load profile 400 (FIG. 4) of the system, either automatically or manually. The curve thicker portion 216 may also change with the control curve 208 based on changes to the load profile 400 (FIG. 4).

Figure 5:
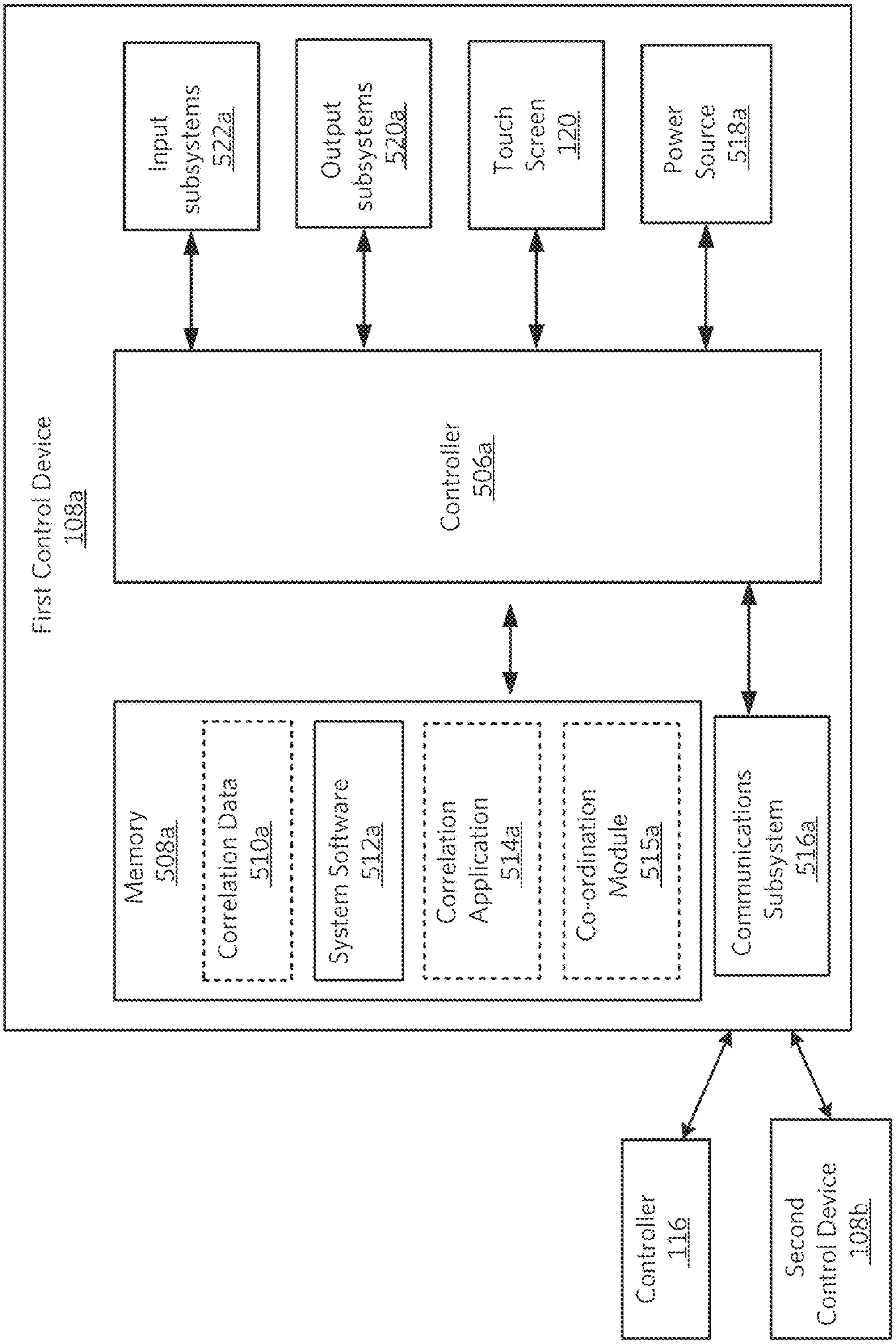
FIG. 5 illustrates an example detailed block diagram of a control device, in accordance with an example embodiment.

FIG. 5 illustrates an example detailed block diagram of the first control device 108*a*, for controlling the first control pump 102*a* (FIG. 1), in accordance with an example embodiment. The second control device 108*b* can be configured in a similar manner as the first control device 108*a*, with similar elements. The first control device 108*a* may include one or more controllers 506*a* such as a processor or microprocessor, which controls the overall operation of the control pump 102*a*. The control device 108*a* may communicate with other external controllers 116 or other control devices (one shown, referred to as second control device 108*b*) to co-ordinate the controlled aggregate output properties 114 of the control pumps 102 (FIG. 1). The controller 506*a* interacts with other device components such as memory 508*a*, system software 512*a* stored in the memory 508*a* for executing applications, input subsystems 522*a*, output subsystems 520*a*, and a communications subsystem 516*a*. A power source 518*a* powers the control device 108*a*. The second control device 108*b* may have the same, more, or less, blocks or modules as the first control device 108*a*, as appropriate. The second control device 108*b* is associated with a second device such as second control pump 102*b* (FIG. 1).

Figure 3:
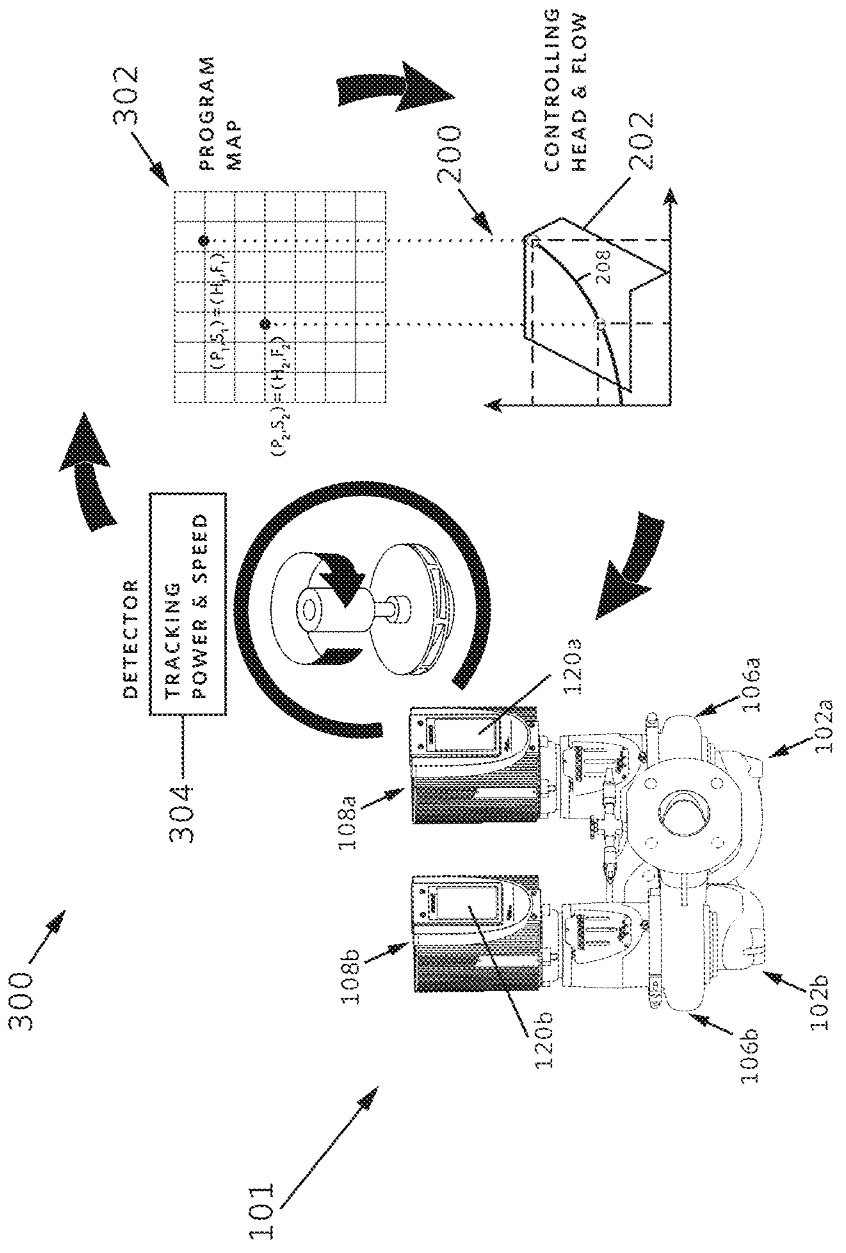
FIG. 3 shows a diagram illustrating internal sensing control of a variable speed control pump.

The input subsystems 522*a* can receive input variables. Input variables can include, for example, sensor information or information from the device detector 304 (FIG. 3). Other example inputs may also be used. The output subsystems 520*a* can control output variables, for example for one or more operable elements of the control pump 102*a*. For example, the output subsystems 520*a* may be configured to control at least the speed of the motor (and impeller) of the control pump 102*a* in order to achieve a resultant desired output setpoint for head and flow (H, F). Other example outputs variables, operable elements, and device properties may also be controlled. The touchscreen 120*a* is a display screen that can be used to input commands based on direct depression onto the screen by a user. The touchscreen 120*a* can be a color touch screen, in an example embodiment. In an example embodiment, the touchscreen 120*a* and the controller 506*a* are integrated in the form of a computer tablet. In an example embodiment, the onboard processor of the computer tablet is used to perform at least some of the pump controller functions.

The communications subsystem 516*a* is configured to communicate with, either directly or indirectly, the other controller 116 and/or the second control device 108*b*. The communications subsystem 516*a* may further be configured for wireless communication. The communications subsystem 516*a* may further be configured for direct communication with other devices, which can be wired and/or wireless. An example short-range communication is Bluetooth® or direct Wi-Fi. The communications subsystem 516*a* may be configured to communicate over a network such as a wireless Local Area Network (WLAN), wireless (Wi-Fi) network, public land mobile network (PLMN), and/or the Internet. These communications can be used to co-ordinate the operation of the control pumps 102 (FIG. 1).

The memory 508*a* may also store other data, such as the load profile 400 (FIG. 4) for the measured "design day" or average annual load. The memory 508*a* may also store other information pertinent to the system or building 104 (FIG. 1), such as height, flow capacity, and other design conditions. In some example embodiments, the memory 508*a* may also store performance information of some or all of the other devices 102, in order to determine the appropriate combined output to achieve the desired setpoint.

One type of conventional pump device estimates the local flow and/or pressure from the electrical variables provided by the electronic variable speed drive. This technology is typically referred to in the art as "sensorless pumps" or "observable pumps". Example implementations using a single pump are described in WO 2005/064167, U.S. Pat. Nos. 7,945,411, 6,592,340 and DE19618462, herein incorporated by reference. The single device can then be controlled, but using the estimated local pressure and flow to then infer the remote pressure, instead of direct fluid measurements. This method saves the cost of sensors and their wiring and installation, however, these references may be limited to the use of a single pump.

In an example embodiment, the intelligent dual pump unit 101 can be configured to operate both pumps 102*a*, 102*b* using at least one internal sensor without necessarily requiring an external sensor, e.g., in a "sensorless" manner. An example of a co-ordinated sensorless system is described in Applicant's PCT Patent Application Publication No. WO 2014/089693 filed Nov. 13, 2013, entitled CO-ORDINATED SENSORLESS CONTROL SYSTEM, herein incorporated by reference.

Reference is now made to FIG. 3, which shows a diagram 300 illustrating internal sensing control (sometimes referred to as "sensorless" control) of one of the control pumps 102 within the range of operation 202, in accordance with example embodiments. For example, an external or proximate sensor would not be required in such example embodiments. An internal detector 304 or sensor may be used to self-detect device properties such as an amount of power and speed (P, S) of an associated motor of the pump device 106. A program map 302 stored in a memory of the control device 108 is used by the control device 108 to map or correlate the detected power and speed (P, S), to resultant output properties, such as head and flow (H, F) of the device 102, for a particular system or building 104. During operation, the control device 108 monitors the power and speed of the pump device 106 using the internal detector 304 and establishes the associated head-flow condition relative to the system requirements. The associated head-flow (H, F) condition of the device 102 can be used to calculate the individual contribution of the device 102 to the total output properties 114 (FIG. 1) at the load. The program map 302 can be used to map the power and speed to control operation of the pump device 106 onto the control curve 208, wherein a point on the control curve is used as the desired device setpoint. For example, referring to FIG. 1, as control valves 112*a*, 112*b*, 112*c*, 112*d* open or close to regulate flow to the cooling coils (e.g. load 110*a*, 110*b*, 110*c*, 110*d*), the control device 108 automatically adjusts the pump speed to match the required system pressure requirement at the current flow.

Note that the internal detector 304 for self-detecting device properties (device variables) contrasts with some systems which may use a local pressure sensor and flow meter which merely directly measures the pressure and flow across the control pump 102. Such variables (local pressure sensor and flow meter) may not be considered device properties (device variables), in example embodiments.

Another example embodiment of a variable speed sensorless device is a compressor which estimates refrigerant flow and lift from the electrical variables provided by the electronic variable speed drive. In an example embodiment, a "sensorless" control system may be used for one or more cooling devices in a controlled system, for example as part of a "chiller plant" or other cooling system. For example, the variable speed device may be a cooling device including a controllable variable speed compressor. In some example embodiments, the self-detecting device properties of the cooling device may include, for example, power and/or speed of the compressor. The resultant output properties may include, for example, variables such as temperature, humidity, flow, lift and/or pressure.

Another example embodiment of a variable speed sensorless device is a fan which estimates air flow and the pressure it produces from the electrical variables provided by the electronic variable speed drive.

Another example embodiment of a sensorless device is a belt conveyor which estimates its speed and the mass it carries from the electrical variables provided by the electronic variable speed drive.

Referring again to FIG. 5, the control device 108*a* can be configured for "sensorless" operation in some example embodiments. The input subsystems 522*a* can receive input variables. Input variables can include, for example, the detector 304 (FIG. 3) for detecting device properties such as power and speed (P, S) of the motor. Other example inputs may also be used. The output subsystems 520*a* can control output variables, for example one or more operable elements of the control pump 102*a*. For example, the output subsystems 520*a* may be configured to control at least the speed of the motor of the control pump 102*a* in order to achieve a resultant desired output setpoint for head and flow (H, F), for example to operate the control pump 102 onto the control curve 208 (FIG. 2). Other example outputs variables, operable elements, and device properties may also be controlled.

In some example embodiments, the control device 108*a* may store data in the memory 508*a*, such as correlation data 510*a*. The correlation data 510*a* may include correlation information, for example, to correlate or infer between the input variables and the resultant output properties. The correlation data 510*a* may include, for example, the program map 302 (FIG. 3) which can map the power and speed to the resultant flow and head at the pump 102, resulting in the desired pressure setpoint at the load output. In other example embodiments, the correlation data 510*a* may be in the form of a table, model, equation, calculation, inference algorithm, or other suitable forms.

In some example embodiments, the correlation data 510*a* stores the correlation information for some or all of the other devices 102, such as the second control pump 102*b* (FIG. 1).

Referring still to FIG. 5, the control device 108*a* includes one or more program applications. In some example embodiments, the control device 108*a* includes a correlation application 514*a* or inference application, which receives the input variables (e.g. power and speed) and determines or infers, based from the correlation data 510*a*, the resultant output properties (e.g. flow and head) at the pump 102*a*. In some example embodiments, the control device 108*a* includes a co-ordination module 515*a*, which can be configured to receive the determined individual output properties from the second control device 108*b*, and configured to logically co-ordinate each of the control devices 108*a*, 108*b*, and provide commands or instructions to control each of the output subsystems 520*a*, 520*b* and resultant output properties in a co-ordinated manner, to achieve a specified output setpoint of the output properties 114.

In some example embodiments, some or all of the correlation application 514*a* and/or the co-ordination module 515*a* may alternatively be part of the external controller 116.

In some example embodiments, in an example mode of operation, the control device 108*a* is configured to receive the input variables from its input subsystem 522*a*, and send such information as detection data (e.g. uncorrelated measured data) over the communications subsystem 516*a* to the other controller 116 or to the second control device 108*b*, for off-device processing which then correlates the detection data to the corresponding output properties. The off-device processing may also determine the aggregate output properties of all of the control devices 108*a*, 108*b*, for example to output properties 114 of a common load. The control device 108*a* may then receive instructions or commands through the communications subsystem 516*a* on how to control the output subsystems 520*a*, for example to control the local device properties or operable elements.

In some example embodiments, in another example mode of operation, the control device 108*a* is configured to receive input variables of the second control device 108*b*, either from the second control device 108*b* or the other controller 116, as detection data (e.g. uncorrelated measured data) through the communications system 516*a*. The control device 108*a* may also self-detect its own input variables from the input subsystem 522*a*. The correlation application 514*a* may then be used to correlate the detection data of all of the control devices 108*a*, 108*b* to their corresponding output properties. In some example embodiments, the co-ordination module 515*a* may determine the aggregate output properties for all of the control devices 108*a*, 108*b*, for example to the output properties 114 of a common load. The control device 108*a* may then send instructions or commands through the communications subsystem 516*a* to the other controller 116 or the second control device 108*b*, on how the second control device 108*b* is to control its output subsystems, for example to control its particular local device properties. The control device 108*a* may also control its own output subsystems 520*a*, for example to control its own device properties to the first control pump 102*a* (FIG. 1).

In some other example embodiments, the control device 108*a* first maps the detection data to the output properties and sends the data as correlated data (e.g. inferred data). Similarly, the control device 108*a* can be configured to receive data as correlated data (e.g. inferred data), which has been mapped to the output properties by the second control device 108*b*, rather than merely receiving the detection data. The correlated data may then be co-ordinated to control each of the control devices 108*a*, 108*b*.

Referring again to FIG. 1, the speed of each of the control pumps 102 can be controlled to achieve or maintain the inferred remote pressure constant by achieving or maintaining $H=H1+(HD-H1)*(Q/QD)^2$ (hereinafter Equation 1), wherein H is the inferred local pressure, H1 is the remote pressure setpoint, HD is the local pressure at design conditions, Q is the inferred total flow and QD is the total flow at design conditions. In example embodiments, the number of pumps running (N) is increased when $H<HD*(Q/QD)^2*(N+0.5+k)$ (hereinafter Equation 2), and decreased if $H>HD*(Q/QD)^2*(N-0.5-k2)$ (hereinafter Equation 3), where k and k2 constants to ensure a deadband around the sequencing threshold.

Figure 8:
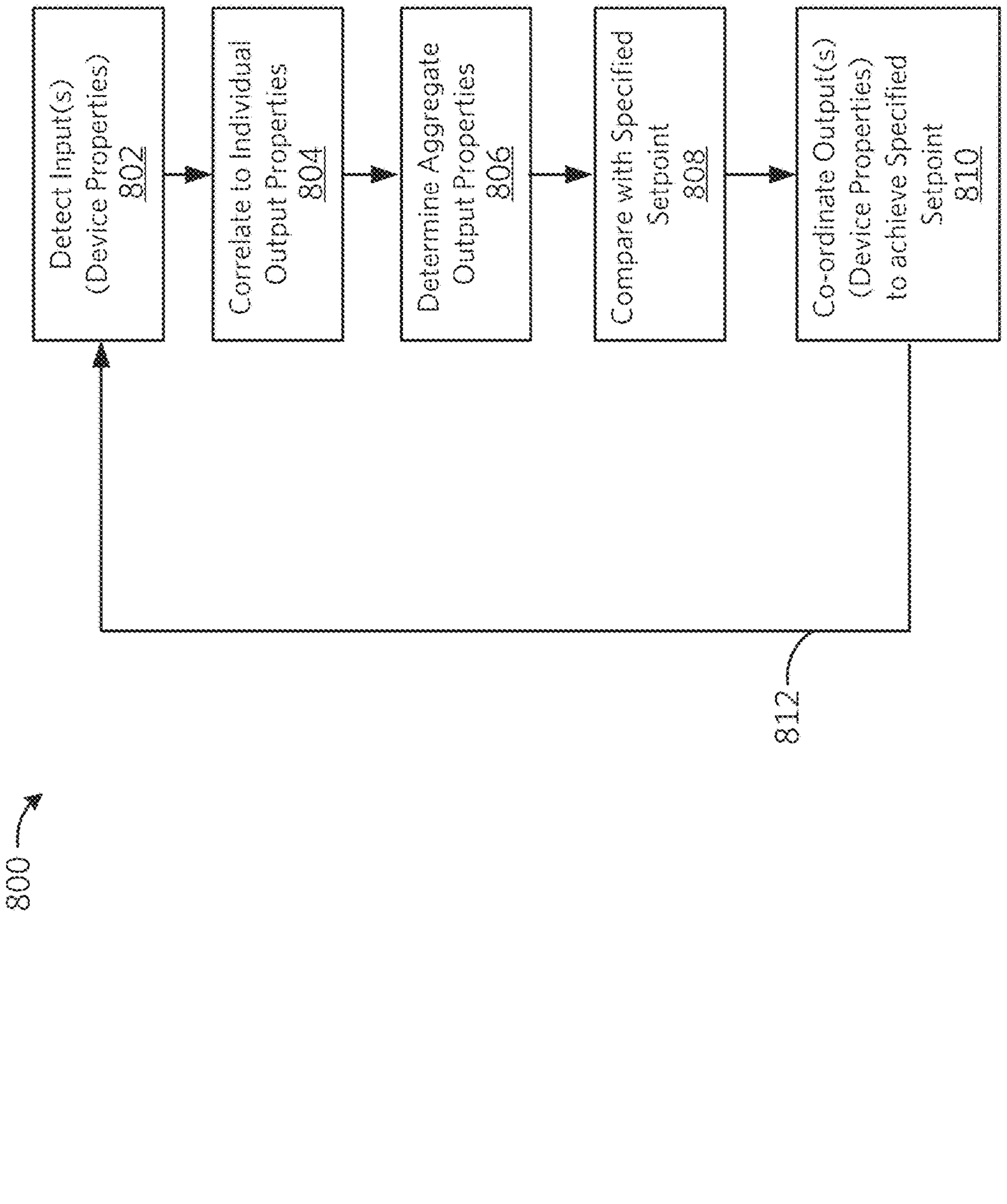
FIG. 8 illustrates a flow diagram of an example method for co-ordinating control of devices, in accordance with an example embodiment.

Reference is now made to FIG. 8, which illustrates a flow diagram of an example method 800 for co-ordinating control of two or more control devices, in accordance with an example embodiment. The devices each include a communication subsystem and are configured to self-detect one or more device properties, the device properties resulting in output having one or more output properties. At event 802, the method 800 includes detecting inputs including the one or more device properties of each device. At event 804, the method 800 includes correlating, for each device, the detected one or more device properties to the one or more output properties, at each respective device. The respective one or more output properties can then be calculated to determine their individual contributions to a system load point. At event 806, the method 800 includes determining the aggregate output properties to the load from the individual one or more output properties. At event 808, the method 800 includes comparing the determined aggregate output properties 114 with a setpoint, such as a pressure setpoint at the load. For example, it may be determined that one or more of the determined aggregate output properties are greater than, less than, or properly maintained at the setpoint. For example, this control may be performed using Equation 1, as detailed above. At event 810, the method includes co-ordinating control of each of the devices to operate the respective one or more device properties to co-ordinate the respective one or more output properties to achieve the setpoint. This may include increasing, decreasing, or maintaining the respective one or more device properties in response, for example to a point on the control curve 208 (FIG. 2). The method 800 may be repeated, for example, as indicated by the feedback loop 812. The method 800 can be automated in that manual control would not be required.

In another example embodiment, the method 800 may include a decision to turn on or turn off one or more of the control pumps 102, based on predetermined criteria. For example, the decision may be made using Equation 2 and Equation 3, as detailed above.

While the method 800 illustrated in FIG. 8 is represented as a feedback loop 812, in some other example embodiments each event may represent state-based operations or modules, rather than a chronological flow.

For example, referring to FIG. 1, the various events of the method 800 of FIG. 8 may be performed by the first control device 108*a*, the second control device 108*b*, and/or the external controller 116, either alone or in combination.

Figure 6:
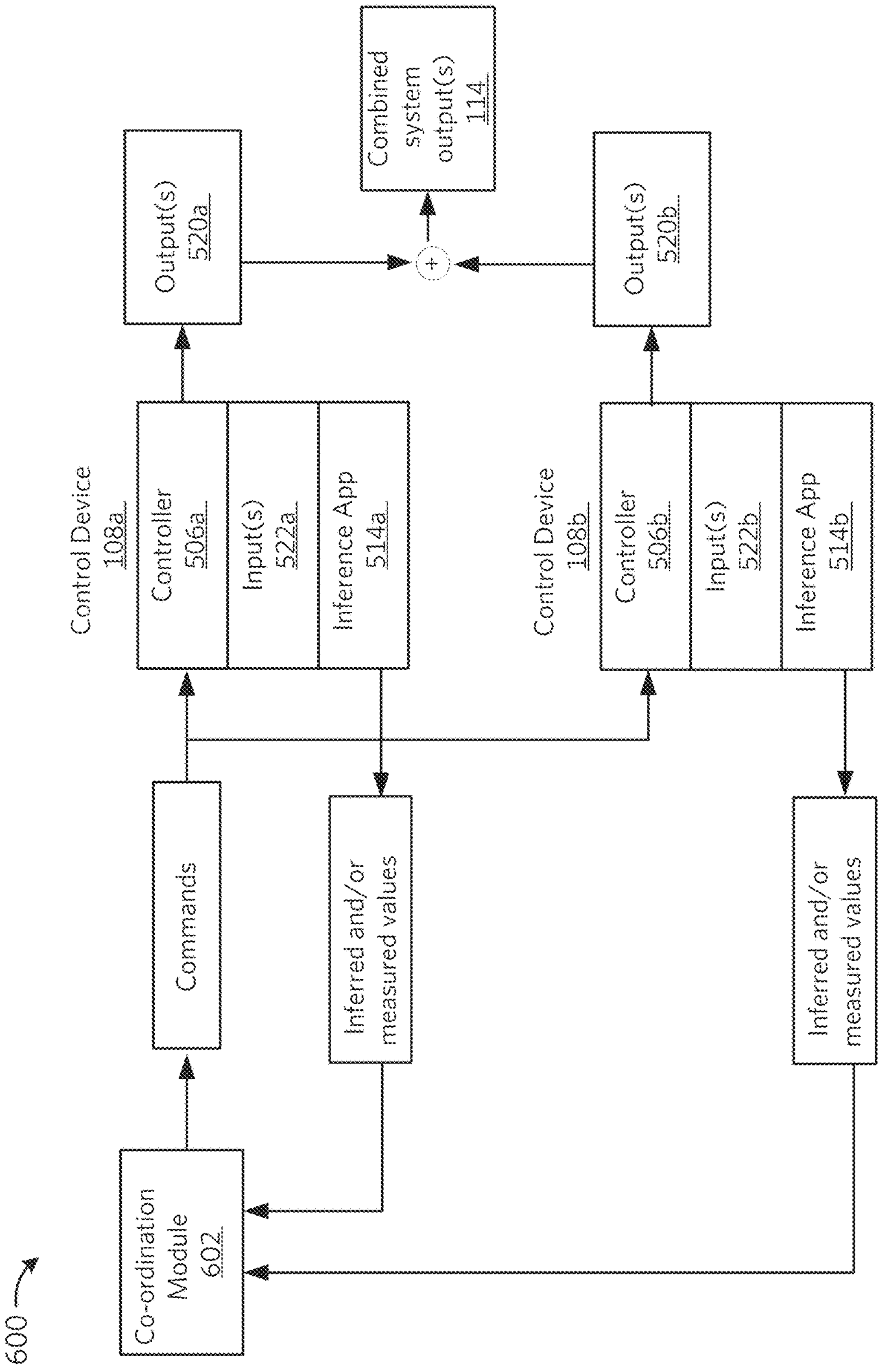
FIG. 6 illustrates a control system for co-ordinating control of devices, in accordance with an example embodiment.

Reference is now made to FIG. 6, which illustrates an example embodiment of a control system 600 for co-ordinating two or more sensorless control devices (two shown), illustrated as first control device 108*a* and second control device 108*b*. Similar reference numbers are used for convenience of reference. As shown, each control device 108*a*, 108*b* may each respectively include the controller 506*a*, 506*b*, the input subsystem 522*a*, 522*b*, and the output subsystem 520*a*, 520*b* for example to control at least one or more operable device members (not shown).

A co-ordination module 602 is shown, which may either be part of at least one of the control devices 108*a*, 108*b*, or a separate external device such as the controller 116 (FIG. 1). Similarly, the inference application 514*a*, 514*b* may either be part of at least one of the control devices 108*a*, 108*b*, or part of a separate device such as the controller 116 (FIG. 1).

In operation, the co-ordination module 602 co-ordinates the control devices 108*a*, 108*b* to produce a co-ordinated output(s). In the example embodiment shown, the control devices 108*a*, 108*b* work in parallel to satisfy a certain demand or shared load 114, and which infer the value of one or more of each device output(s) properties by indirectly inferring them from other measured input variables and/or device properties. This co-ordination is achieved by using the inference application 514*a*, 514*b* which receives the measured inputs, to calculate or infer the corresponding individual output properties at each device 102 (e.g. head and flow at each device). From those individual output properties, the individual contribution from each device 102 to the load (individually to output properties 114) can be calculated based on the system/building setup. From those individual contributions, the co-ordination module 602 estimates one or more properties of the aggregate or combined output properties 114 at the system load of all the control devices 108*a*, 108*b*. The co-ordination module 602 compares with a setpoint of the combined output properties (typically a pressure variable), and then determines how the operable elements of each control device 108*a*, 108*b* should be controlled and at what intensity.

It would be appreciated that the aggregate or combined output properties 114 may be calculated as a linear combination or a non-linear combination of the individual output properties, depending on the particular property being calculated, and to account for losses in the system, as appropriate.

In some example embodiments, when the co-ordination module 602 is part of the first control device 108*a*, this may be considered a master-slave configuration, wherein the first control device 108*a* is the master device and the second control device 108*b* is the slave device. In another example embodiment, the co-ordination module 602 is embedded in more of the control devices 108*a*, 108*b* than actually required, for fail safe redundancy.

Referring still to FIG. 6, some particular example controlled distributions to the output subsystems 520*a*, 520*b* will now be described in greater detail. In one example embodiment, for example when the output subsystems 520*a*, 520*b* are associated with controlling device properties of equivalent type or performance, the device properties of each control pump 102 may be controlled to have equal device properties to distribute the flow load requirements. In other example embodiments, there may be unequal distribution, for example the first control pump 102*a* may have a higher flow capacity than the second control pump 102*b* (FIG. 1). In another example embodiment, each control pump 102 may be controlled so as to best optimize the efficiency of the respective control pumps 102 at partial load, for example to maintain their respective control curves 208 (FIG. 2) or to best approach Point B (212) on the respective control curve 208.

Referring still to FIG. 6, in an optimal system running condition, each of the control devices 108*a*, 108*b* are controlled by the co-ordination module 602 to operate on their respective control curves 208 (FIG. 2) to maintain the pressure setpoint at the output properties 114. This also allows each control pump 102 to be optimized for partial load operation. For example, as an initial allocation, each of the control pumps 102 may be given a percentage flow allocation (e.g. can be 50% split between each control device 108*a*, 108*b* in this example), to determine or calculate the required initial setpoint (e.g. Point A (210), FIG. 2). The percentage responsibility of required flow for each control pump 102 can then be determined by dividing the percentage flow allocation from the inferred total output properties 114. Each of the control pumps 102 can then be controlled along their control curves 208 to increase or decrease operation of the motor or other operable element, to achieve the percentage responsibility per required flow.

However, if one of the control pumps (e.g. first control pump 102*a*) is determined to be underperforming or off of its control curve 208, the co-ordination module 602 may first attempt to control the first control pump 102*a* to operate onto its control curve 208. However, if this is not possible (e.g. damaged, underperforming, would result in outside of operation range 202, otherwise too far off control curve 208, etc.), the remaining control pumps (e.g. 102*b*) may be controlled to increase their device properties on their respective control curves 208 in order to achieve the pressure setpoint at the required flow at the output properties 114, to compensate for at least some of the deficiencies of the first control pump 102*a*. Similarly, one of the control pumps 102 may be intentionally disabled (e.g. maintenance, inspection, save operating costs, night-time conservation, etc.), with the remaining control pumps 102 being controlled accordingly.

In other example embodiments, the distribution between the output subsystems 520*a*, 520*b* may be dynamically adjusted over time so as to track and suitably distribute wear as between the control pumps 102.

Figure 7:
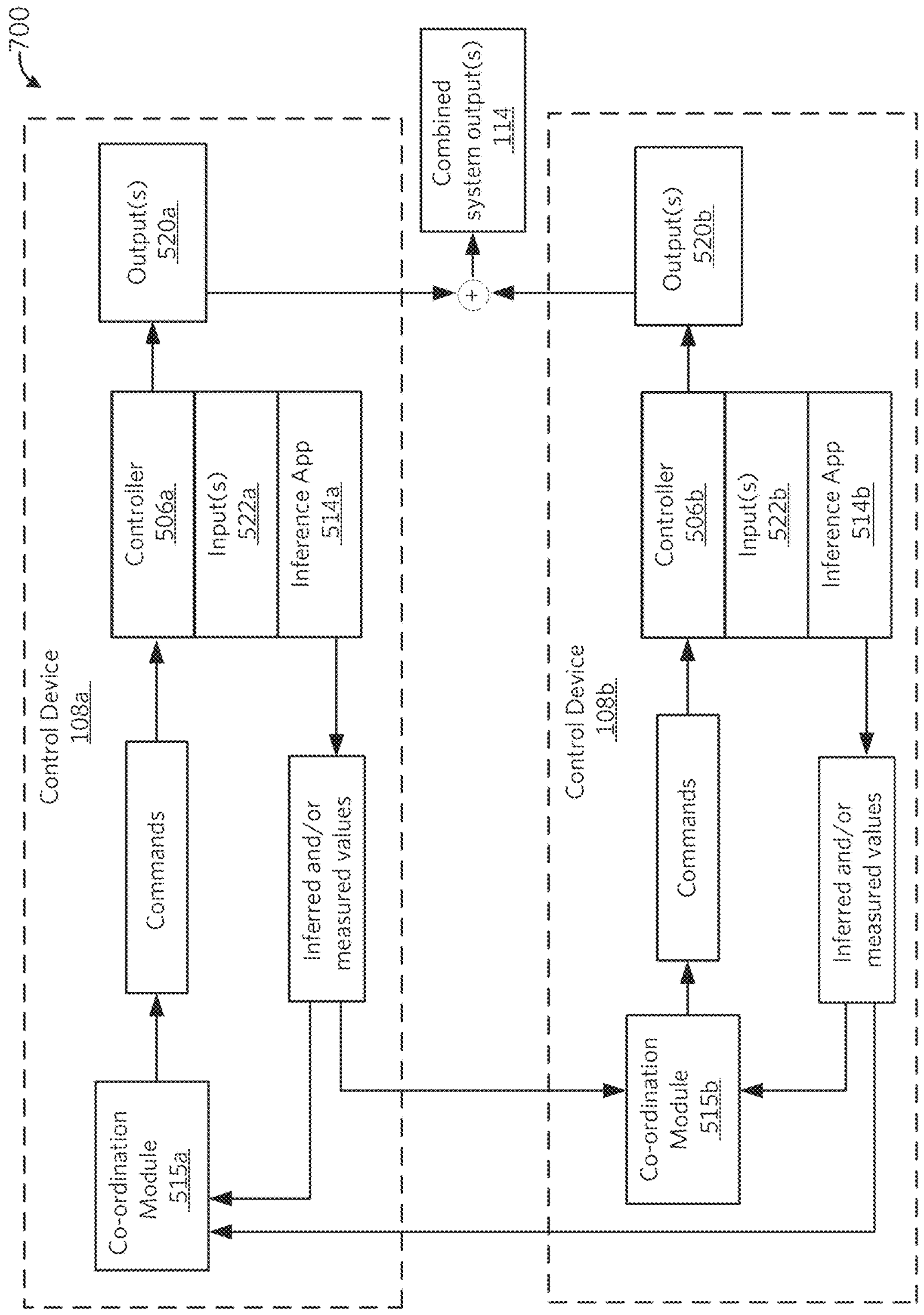
FIG. 7 illustrates another control system for co-ordinating control of devices, in accordance with another example embodiment.

Reference is now made to FIG. 7, which illustrates another example embodiment of a control system 700 for co-ordinating two or more sensorless control devices (two shown), illustrated as first control device 108*a* and second control device 108*b*. Similar reference numbers are used for convenience of reference. This may be referred to as a peer-to-peer system, in some example embodiments. An external controller 116 may not be required in such example embodiments. In the example shown, each of the first control device 108*a* and second control device 108*b* may control their own output subsystems 520*a*, 520*b*, so as to achieve a co-ordinated combined system output 114. As shown, each co-ordination module 515*a*, 515*b* is configured to each take into account the inferred and/or measured values from both of the input subsystems 522*a*, 522*b*. For example, as shown, the first co-ordination module 515*a* may estimate one or more output properties of the combined output properties 114 from the individual inferred and/or measured values.

As shown, the first co-ordination module 515*a* receives the inferred and/or measured values and calculates the individual output properties of each device 102 (e.g. head and flow). From those individual output properties, the individual contribution from each device 102 to the load (individually at output properties 114) can be calculated based on the system/building setup. The first co-ordination module 515*a* can then calculate or infer the aggregate output properties 114 at the load.

The first co-ordination module 515*a* then compares the inferred aggregate output properties 114 with a setpoint of the output properties (typically a pressure variable setpoint), and then determines the individual allocation contribution required by the first output subsystem 520*a* (e.g. calculating 50% of the total required contribution in this example). The first output subsystem 520*a* is then controlled and at a controlled intensity (e.g. increase, decrease, or maintain the speed of the motor, or other device properties), with the resultant co-ordinated output properties being again inferred by further measurements at the input subsystem 522*a*, 522*b*.

As shown in FIG. 7, the second co-ordination module 515*b* may be similarly configured as the first co-ordination module 515*a*, to consider both input subsystem 522*a*, 522*b* to control the second output subsystem 520*b*. For example, each of the control pumps 102 may be initially given a percentage flow allocation. Each of the control pumps 102 can then be controlled along their control curves 208 to increase or decrease operation of the motor or other operable element, based on the aggregate load output properties 114. The aggregate load output properties 114 may be used to calculate per control pump 102, the require flow and corresponding motor speed (e.g. to maintain the percentage flow, e.g. 50% for each output subsystem 520*a*, 520*b* in this example). Accordingly, both of the co-ordination modules 515*a*, 515*b* operate together to co-ordinate their respective output subsystems 520*a*, 520*b* to achieve the selected output setpoint at the load output properties 114.

As shown in FIG. 7, note that in some example embodiments each of the co-ordination modules 515*a*, 515*b* are not necessarily in communication with each other in order to functionally operate in co-ordination. In other example embodiments, not shown, the co-ordination modules 515*a*, 515*b* are in communication with each other for additional co-ordination there between.

Reference is now made to FIGS. 17A, 17B, 17C, 17D, 17E, 17F, 17G and 17H, which illustrate a pump unit 1700 in accordance with an example embodiment. The pump unit 1700 illustrates a single control pump in a vertical inline closed-coupled configuration, in an example embodiment. The pump unit 1700 is an integrated unit, with the components physically integrated together as a standalone unit. The pump unit 1700 includes a controller device 1708 (including a controller/processor) and a pump device 1706 which may take on various forms of pumps which have variable speed control. The pump unit 1700 includes a pump impeller within a sealed casing which houses the pump device 1706, which includes a suction flange 1724 for connecting to a line for receiving a circulating medium, and a discharge flange 1726 for connecting to a line for outputting of the circulating medium. The pump unit 1700 includes a suction bay 1728. A volute 1730 is fed from the suction bay 1728 and is used for housing of the pump impeller. A respective variable motor, not shown here, can be variably controlled from the control device 1708 to rotate at variable speeds. The pump unit 1700 may further include a touchscreen 1720 for interaction, input and/or output, between the user and the control device 1708. The pump impeller is operably coupled to the motor and spins based on the speed of the motor, to circulate the circulating medium. In an example embodiment, the control device 1708 is configured to control the respective pump impeller in a range of 0% to 100% of motor speed. The volute 1730 can be configured to receive the circulating medium being pumped by the respective pump impeller. The volute 1730 can comprise a curved funnel that increases in area as it approaches the discharge flange 1726. The casing of the pump unit 1700 further includes a pedestal casing 1734 which houses a shaft(s) between the pump motor and the pump impeller.

Figure 17A:
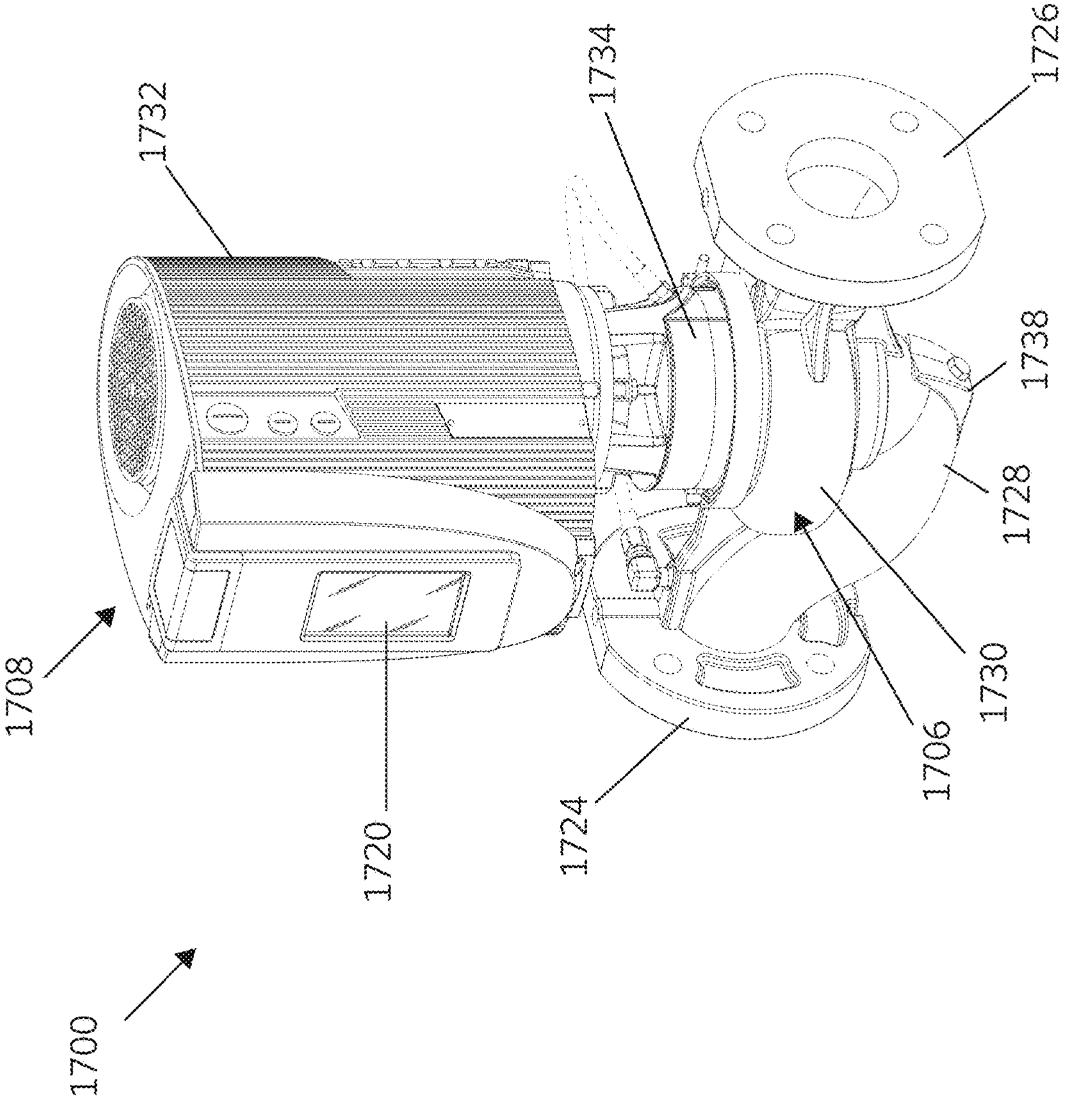
FIG. 17A illustrates a front perspective view of a pump unit having a closed-coupled vertical inline pump.
Figure 17B:
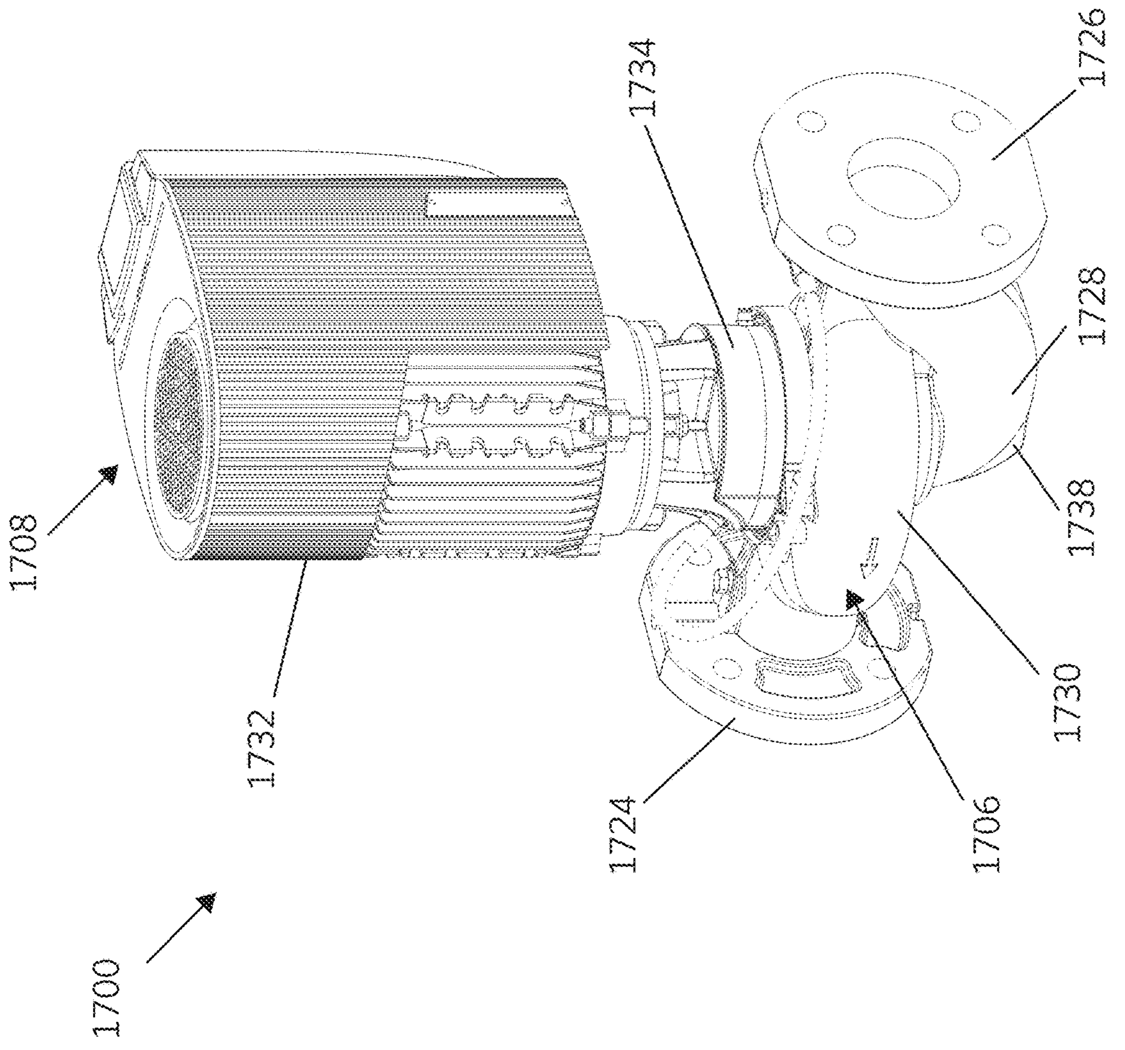
FIG. 17B illustrates a rear perspective view of the pump unit shown in FIG. 17A.
Figure 17C:
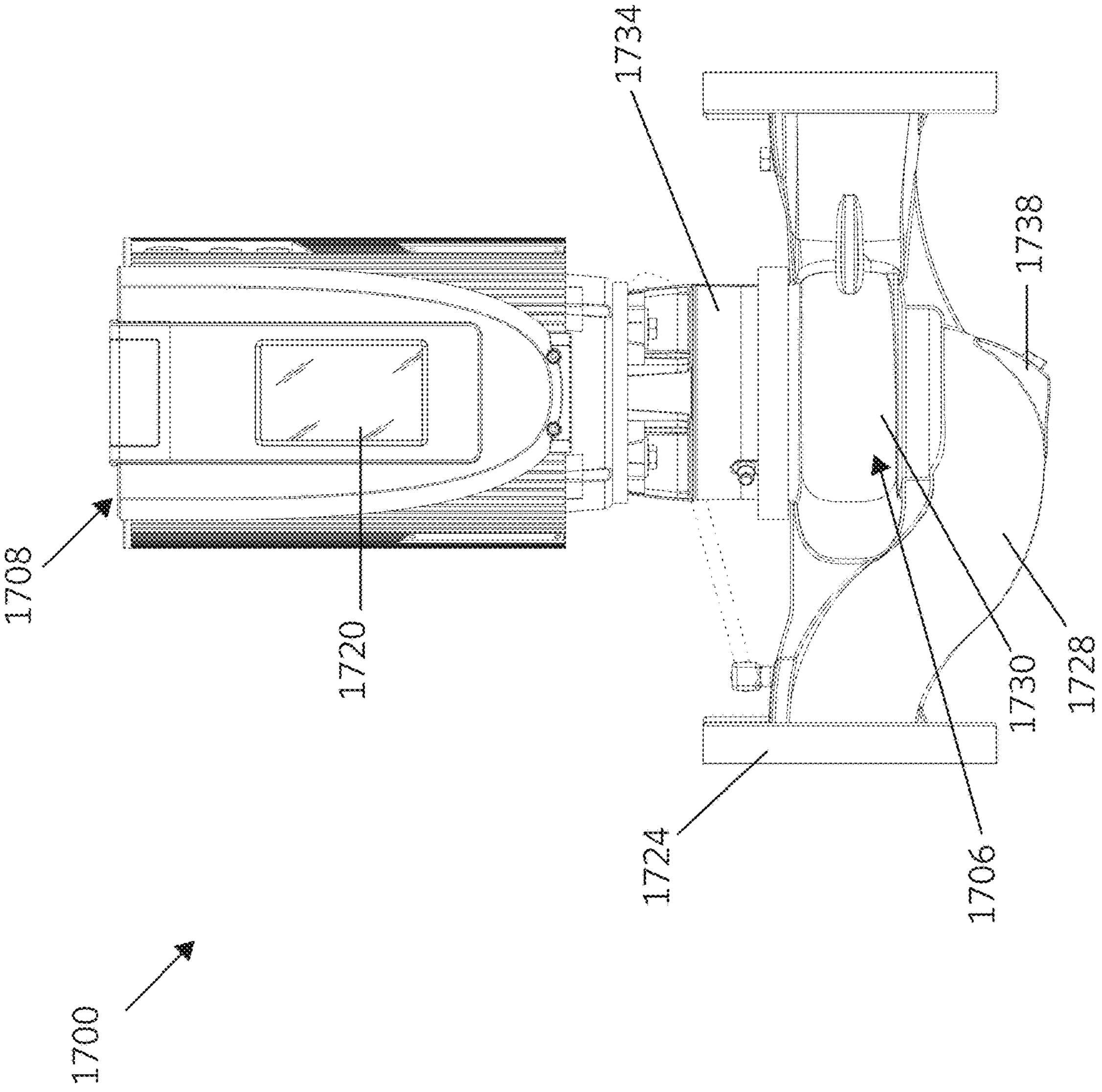
FIG. 17C illustrates a front view of the pump unit shown in FIG. 17A.
Figure 17D:
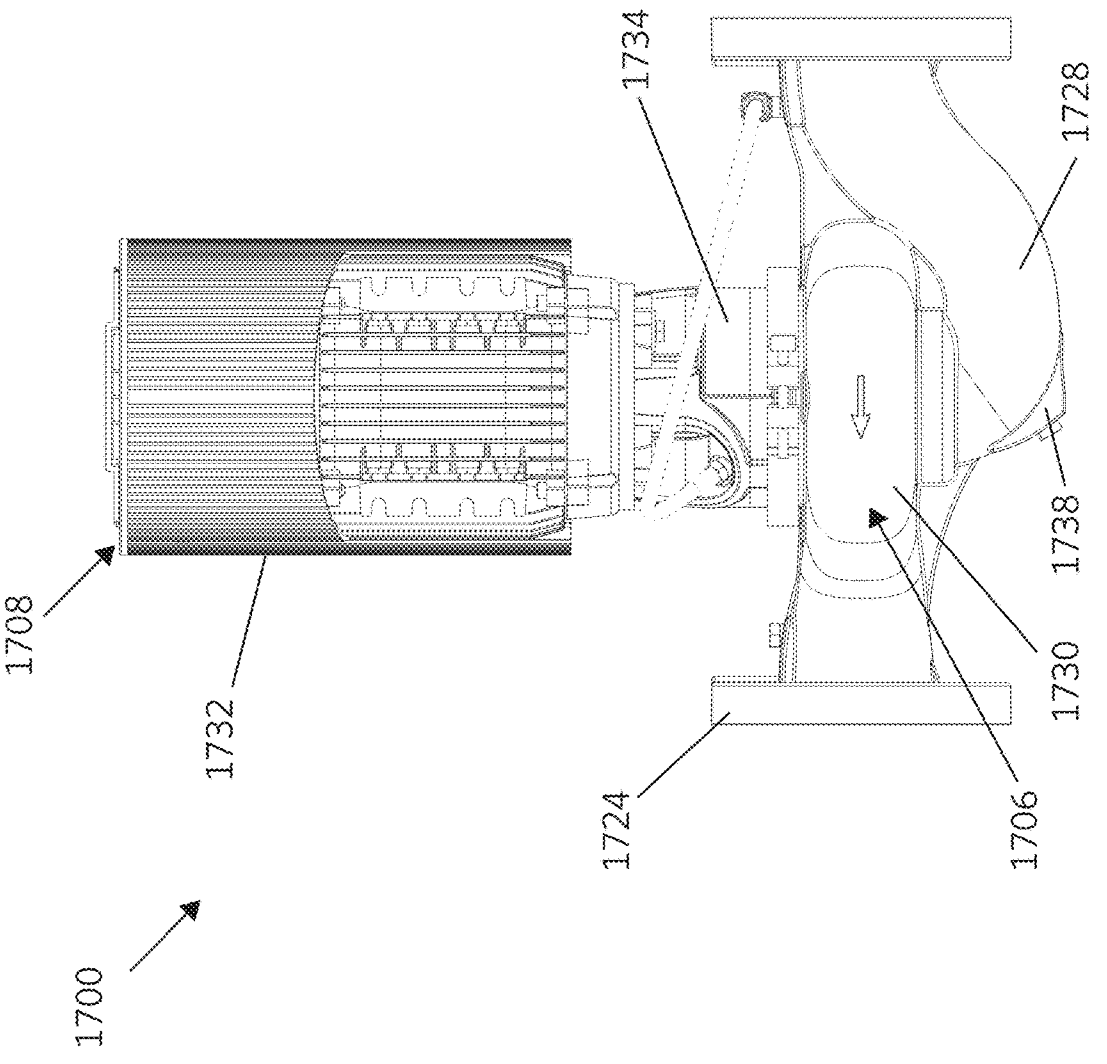
FIG. 17D illustrates a rear view of the pump unit shown in FIG. 17A.
Figure 17E:
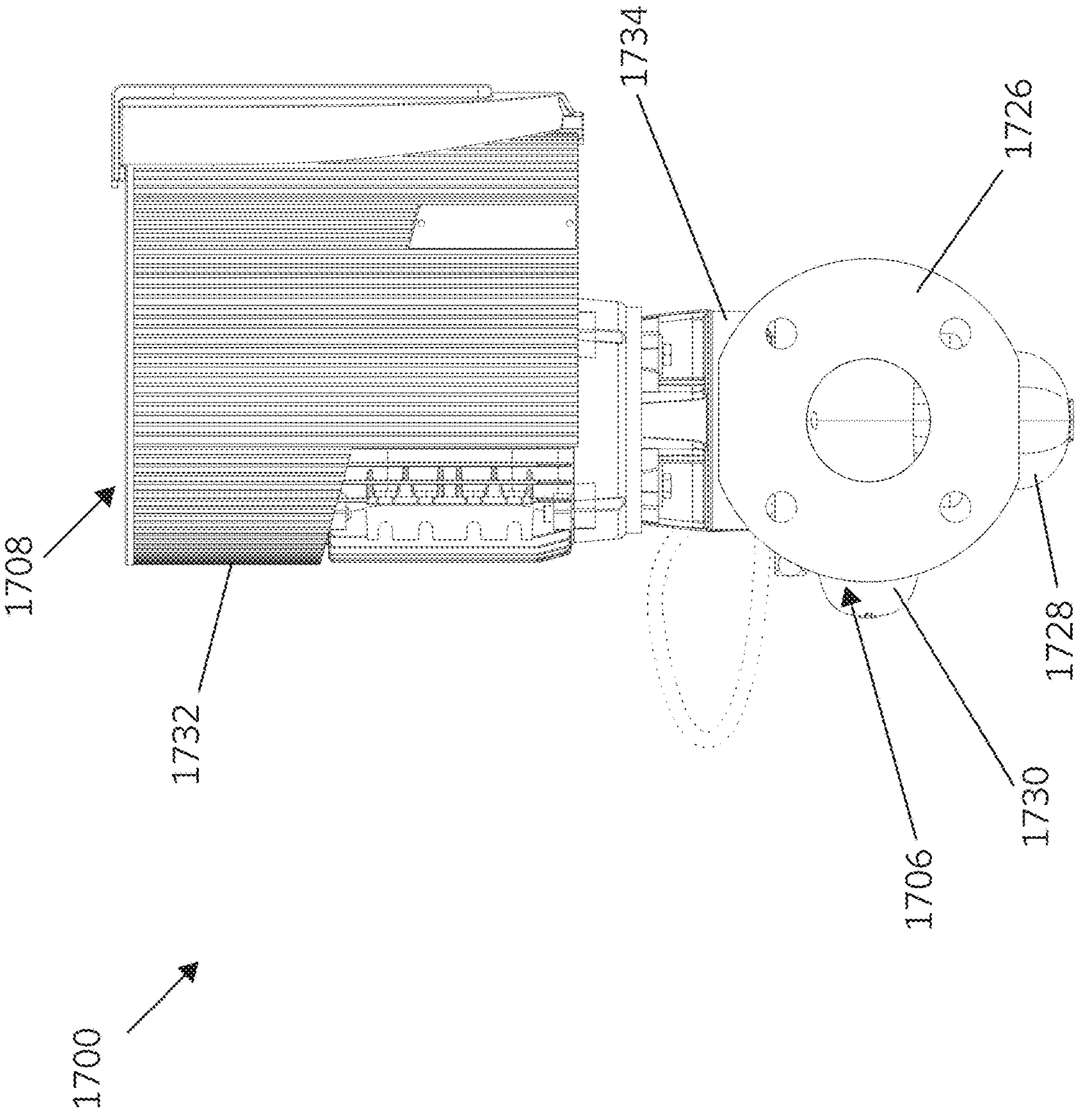
FIG. 17E illustrates a left side view of the pump unit shown in FIG. 17A.
Figure 17F:
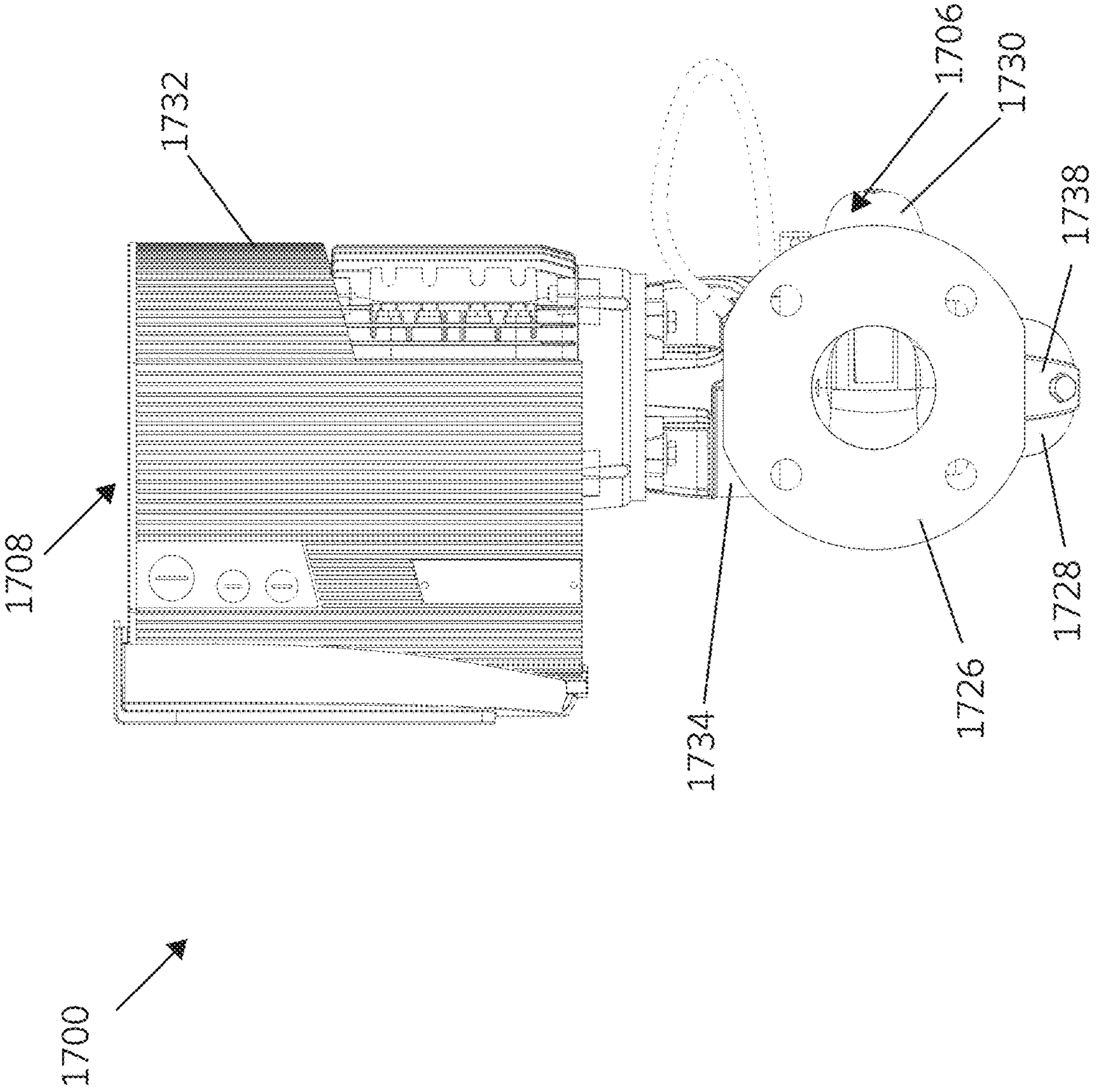
FIG. 17F illustrates a right side view of the pump unit shown in FIG. 17A.
Figure 17G:
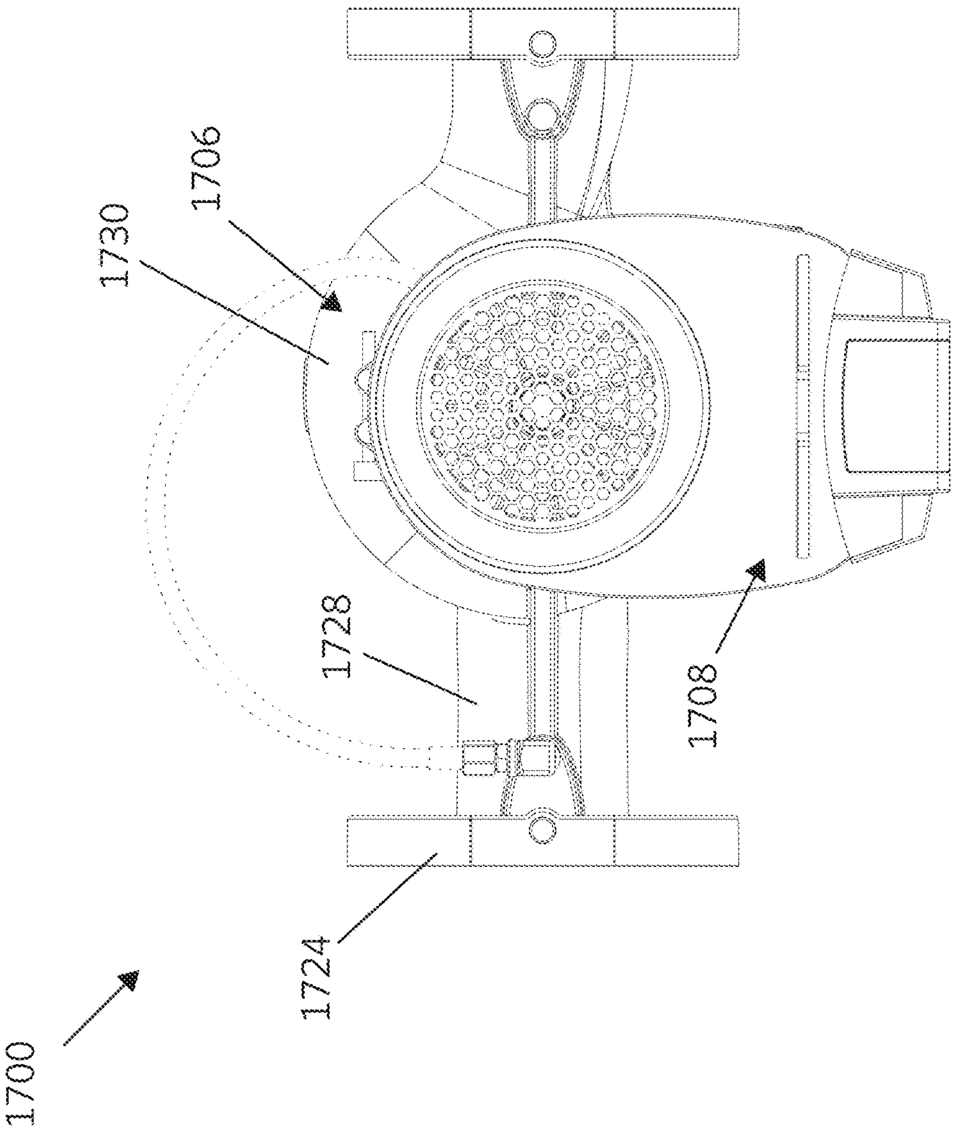
FIG. 17G illustrates a top view of the pump unit shown in FIG. 17A.
Figure 17H:
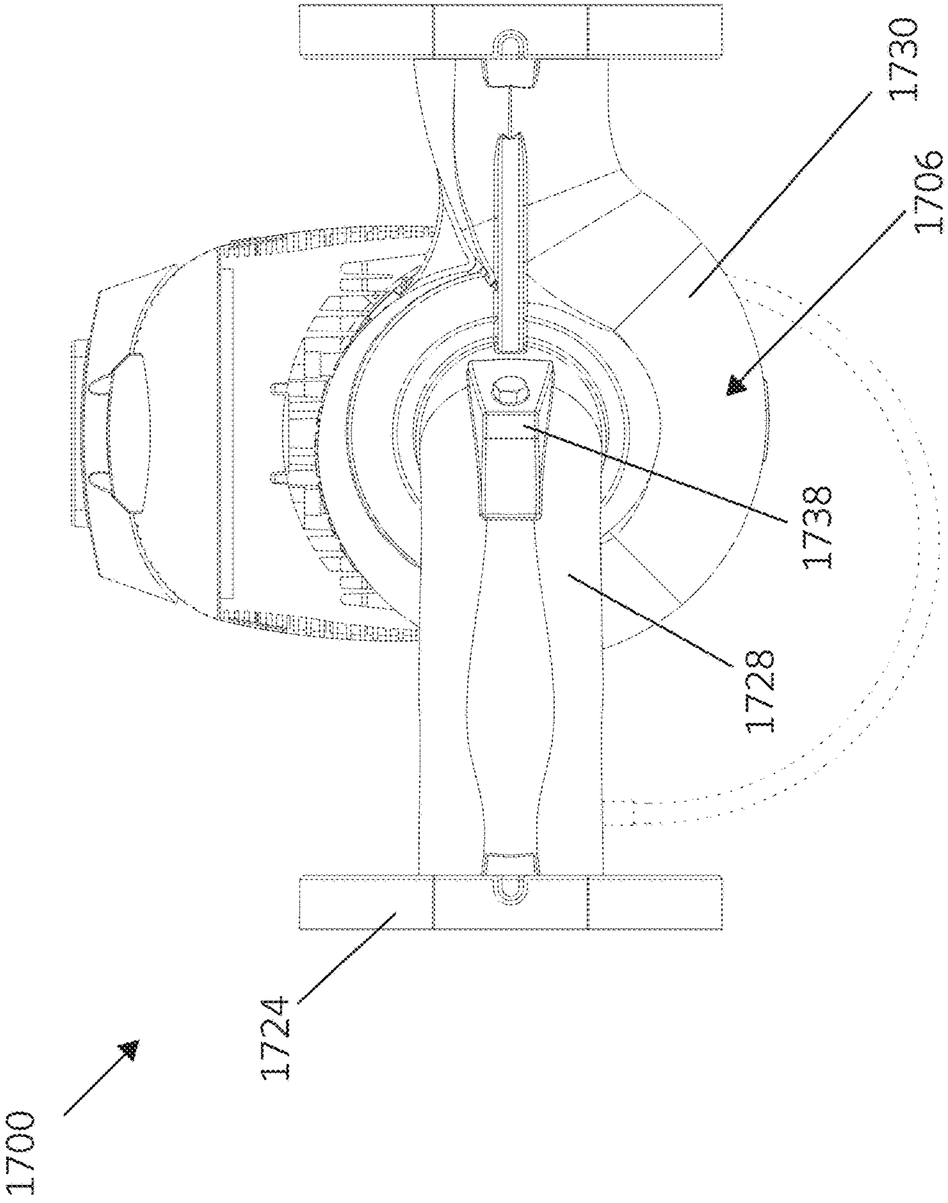
FIG. 17H illustrates a bottom view of the pump unit shown in FIG. 17A.
Figure 18A:
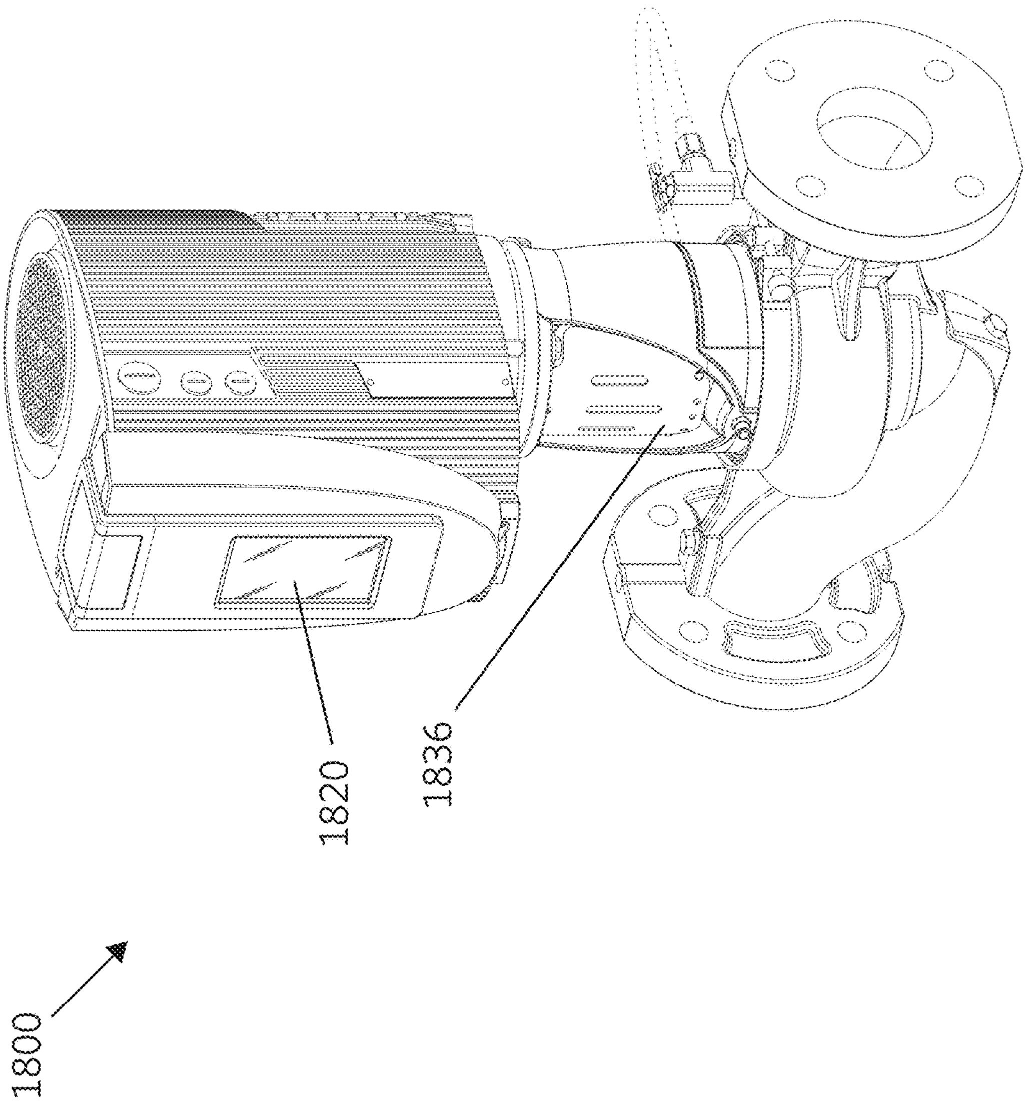
FIG. 18A illustrates a front perspective view of a pump unit having a split-coupled vertical inline pump.
Figure 18B:
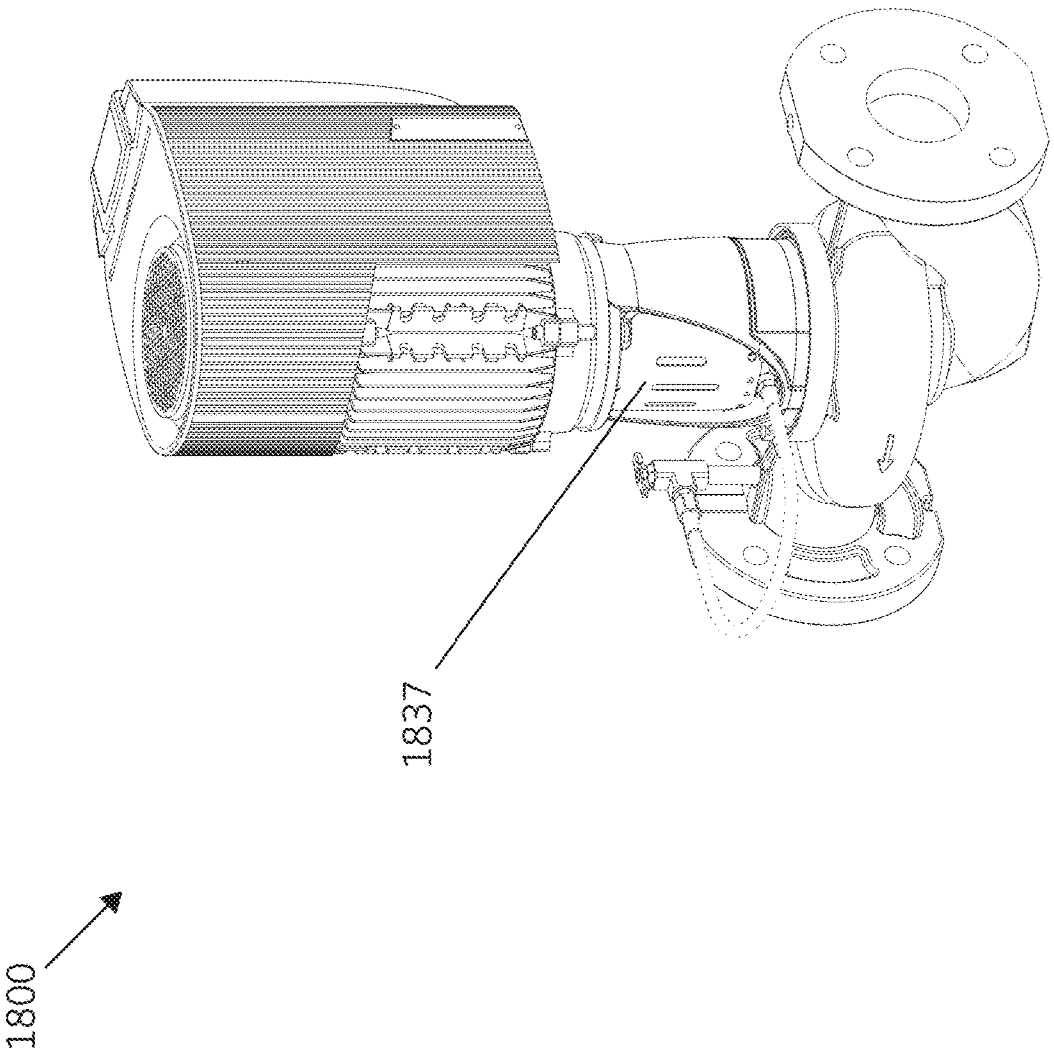
FIG. 18B illustrates a rear perspective view of the pump unit shown in FIG. 18A.
Figure 18C:
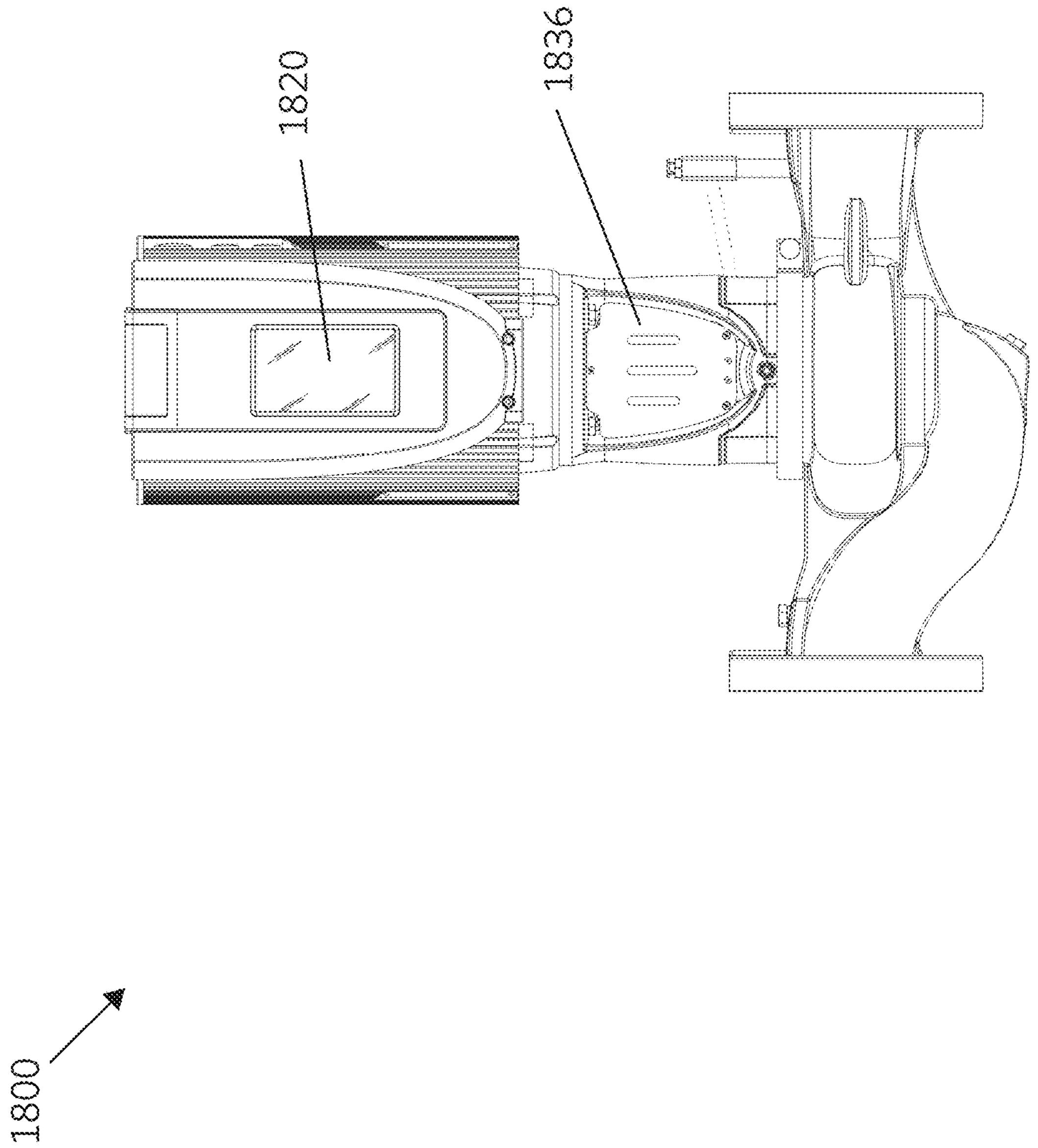
FIG. 18C illustrates a front view of the pump unit shown in FIG. 18A.
Figure 18D:
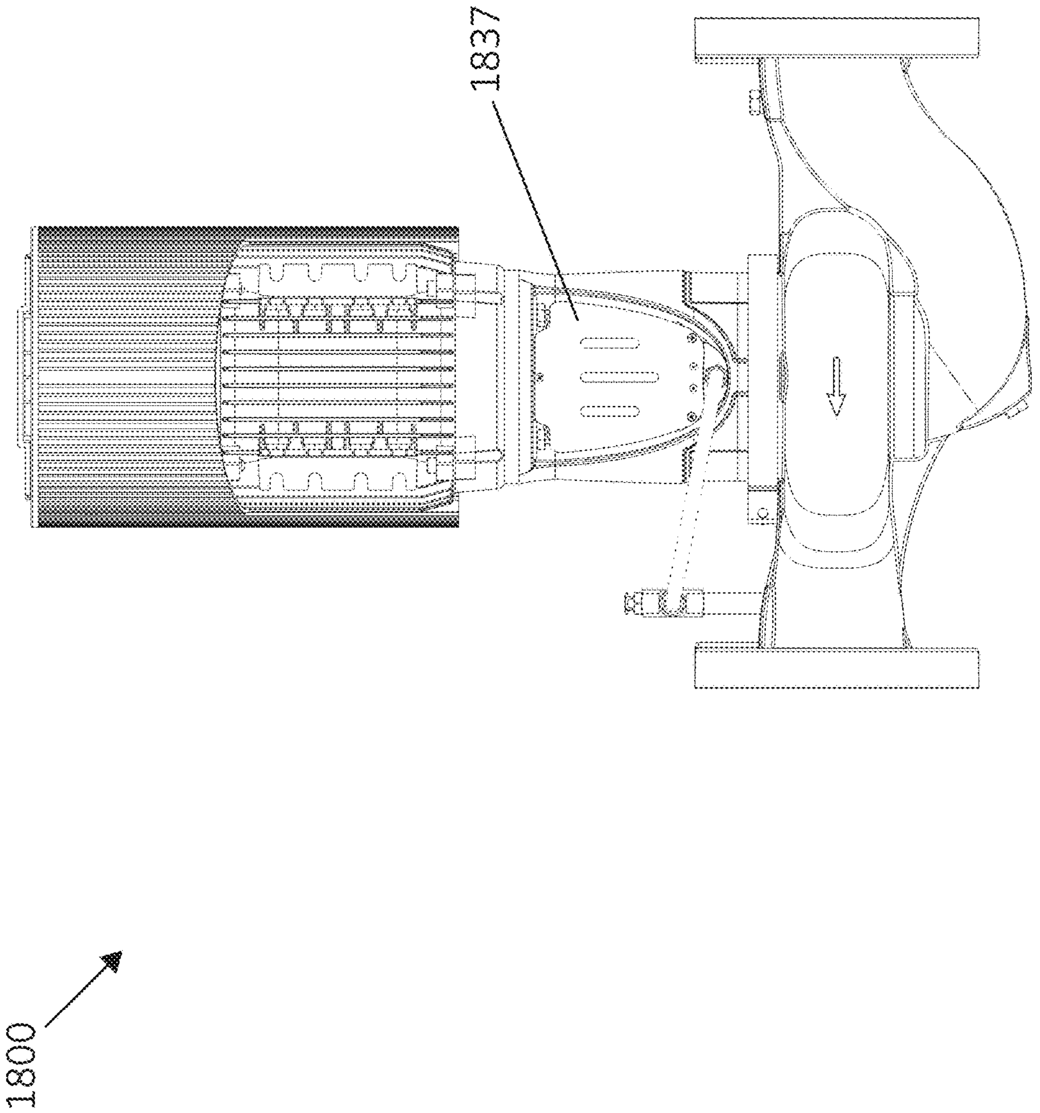
FIG. 18D illustrates a rear view of the pump unit shown in FIG. 18A.
Figure 18E:
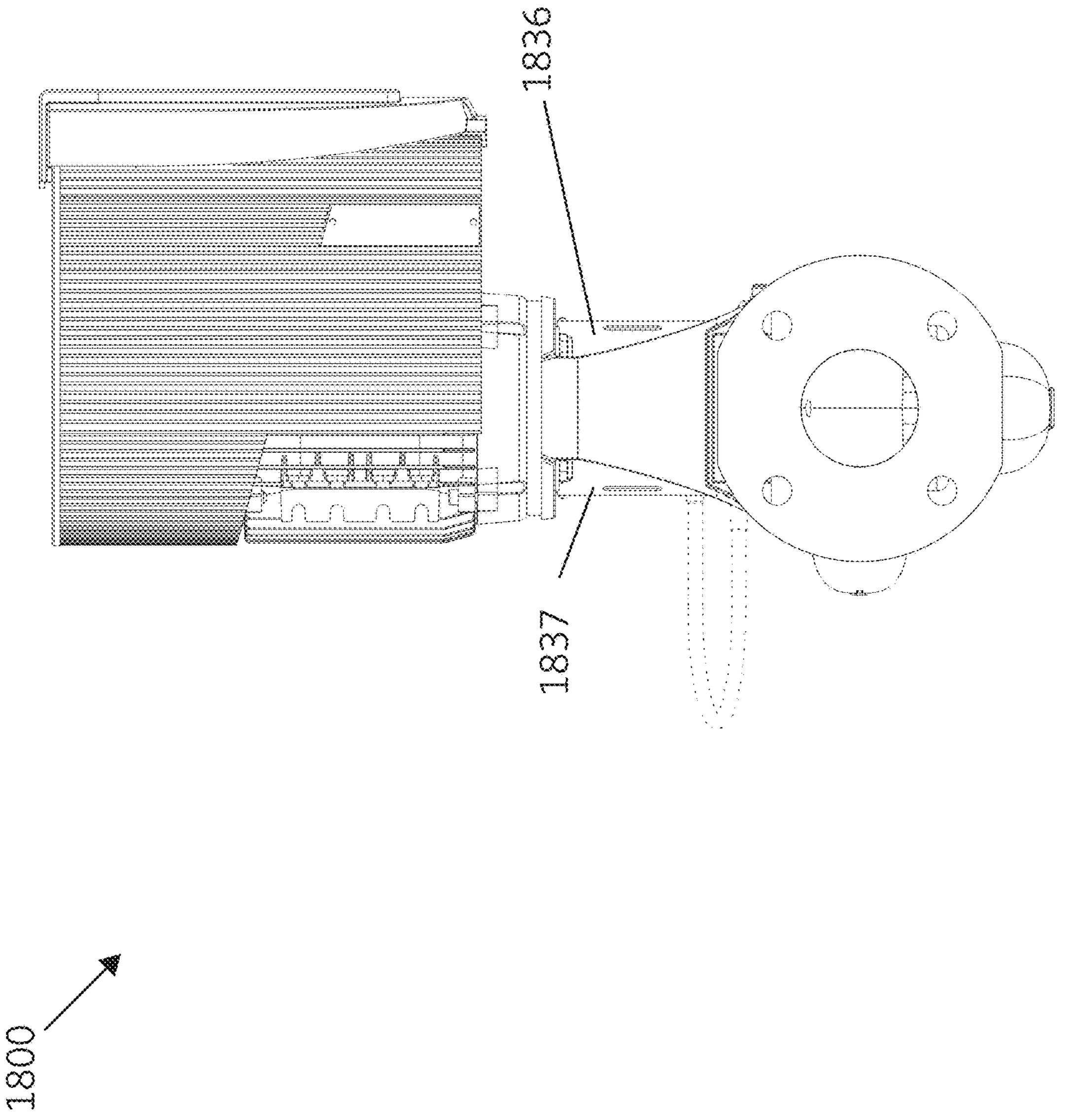
FIG. 18E illustrates a left side view of the pump unit shown in FIG. 18A.
Figure 18F:
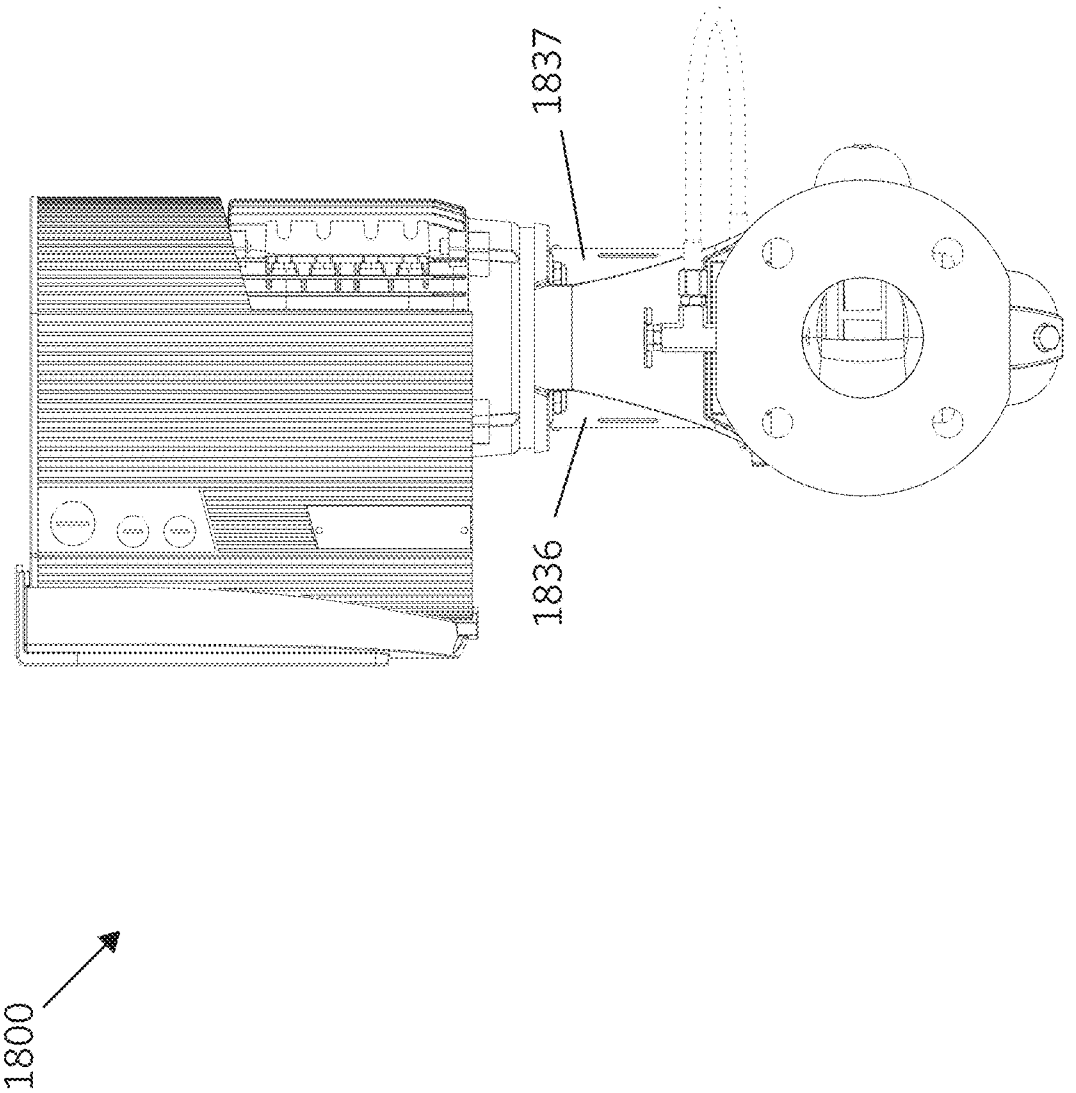
FIG. 18F illustrates a right side view of the pump unit shown in FIG. 18A.
Figure 18G:
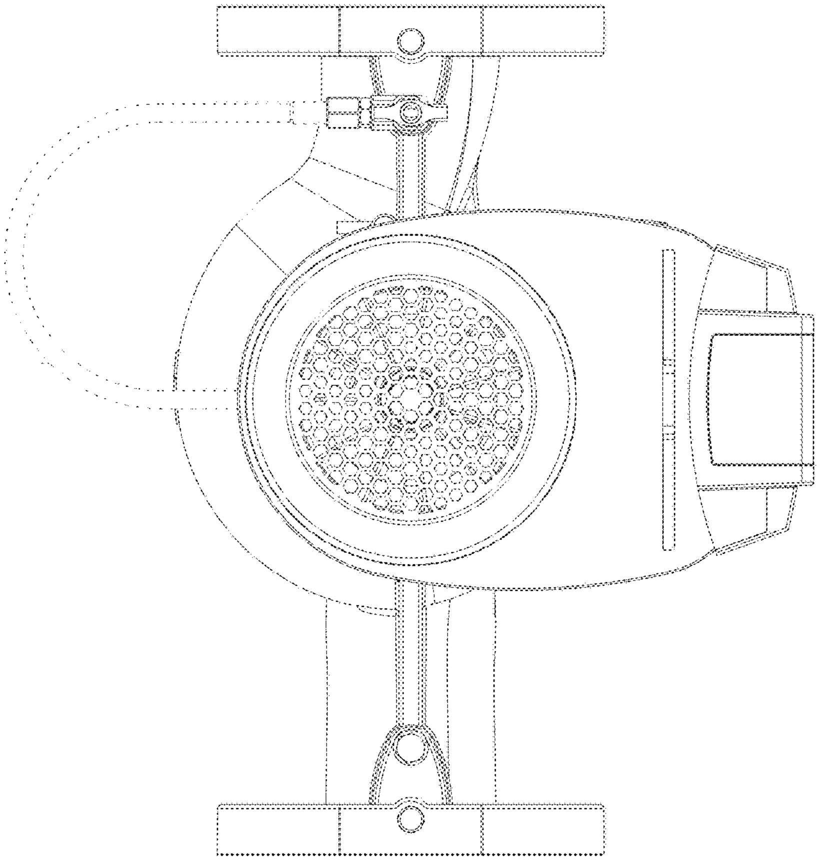
FIG. 18G illustrates a top view of the pump unit shown in FIG. 18A.
Figure 18H:
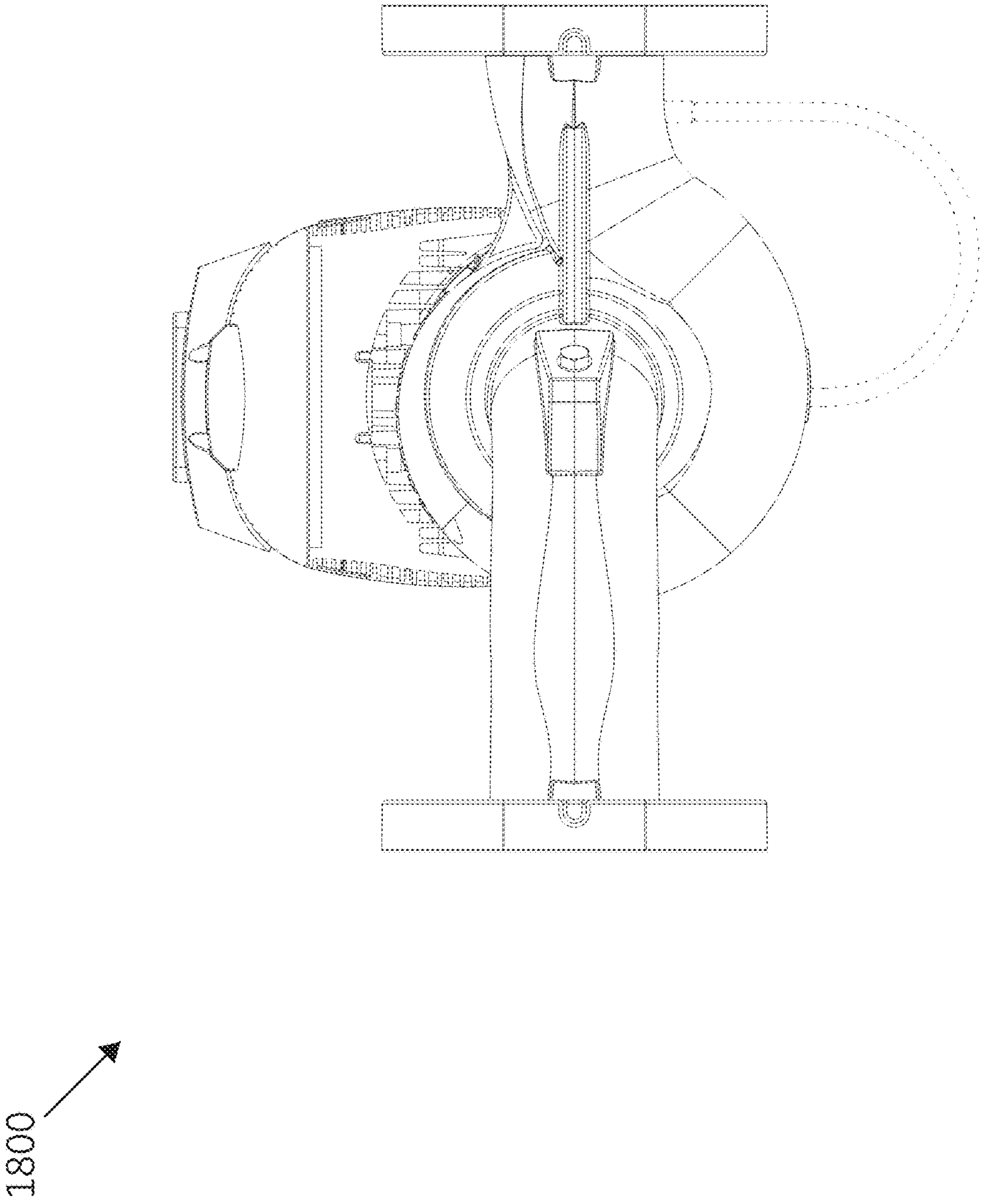
FIG. 18H illustrates a bottom view of the pump unit shown in FIG. 18A.

FIGS. 17A and 17H illustrate a flattened bottom feature of the pump unit 1700. In an example embodiment, the suction bay 1728 includes an exterior flange 1738 which has a flattened bottom. As shown, the exterior flange 1738 defines a flat surface. For example, the exterior flange 1738 provides a flat region of contact so that the pump unit 1700 can stand on its own on a flat surface, for example during setup and installation of the pump unit 1700. For example the flattened bottom can enable the pump unit 1700 to stand up-right during assembly, packaging, and/or installation processes. In an example embodiment, the exterior flange 1738 is integrally formed and unitary with the respective suction bay 1728, for example during casting or moulding.

Reference is now made to FIGS. 18A, 18B, 18C, 18D, 18E, 18F, 18G and 18H, which illustrate a pump unit 1800 in accordance with an example embodiment. The pump unit 1800 is similar to the pump unit 1700, but differs in that the single control pump is in a vertical inline split-coupled configuration, in accordance an example embodiment. The pump unit 1800 may further include a touchscreen 1820 for interaction, input and/or output, with the user.

For the pump unit 1800, the connection between the pump motor and respective pump impeller can be split into two separate shafts, and further includes a pump seal (not shown). In an example embodiment, this connection is axially split, and a spacer type rigid coupling permits seal maintenance without disturbing the pump impeller and/or pump motor. For example, there can be a front removable cover 1836 and a rear removable cover 1837. When the cover 1836, 1837 is removed, the seal (not shown) for each pump motor within the pedestal casing can be replaced without removing the respective pump motor, for example.

In example embodiments, example screenshots of the touchscreen 1720, 1820 are illustrated in FIGS. 16A, 16B, 16C and 16D. These screenshots illustrate example user interfaces that can be used in the pump unit 1700, 1800 to facilitate setup and/or commissioning of the respective control device for the respective control pump.

Although example embodiments have been primarily described with respect to one pump unit, in some example embodiments a plurality of such pump units can be used in a system, for example arranged in parallel. In some example embodiments the pump units can be arranged in series, for example for a pipeline, booster, or other such application. The resultant output properties may still be co-ordinated in such example embodiments. For example, the output setpoint and output properties for the load may be the located at the end of the series. The control of the output subsystems, device properties, and operable elements may still be performed in a co-ordinated manner in such example embodiments. In some example embodiments, the pump units can be arranged in a combination of series and parallel.

Variations may be made in example embodiments. Some example embodiments may be applied to any variable speed device, and not limited to variable speed control pumps. For example, some additional embodiments may use different parameters or variables, and may use more than two parameters (e.g. three parameters on a three dimensional graph). For example, the speed (rpm) is also illustrated on the described control curves. Further, temperature (Celsius/Fahrenheit) versus temperature load (Joules or BTU/hr) may be parameters or variables which are considered for control curves, for example controlled by a variable speed circulating fan. Some example embodiments may be applied to any devices which are dependent on two or more correlated parameters. Some example embodiments can include selection ranges dependent on parameters or variables such as liquid, temperature, viscosity, suction pressure, site elevation and number of pump operating.

In example embodiments, as appropriate, each illustrated block or module may represent software, hardware, or a combination of hardware and software. Further, some of the blocks or modules may be combined in other example embodiments, and more or less blocks or modules may be present in other example embodiments. Furthermore, some of the blocks or modules may be separated into a number of sub-blocks or sub-modules in other embodiments.

While some of the present embodiments are described in terms of methods, a person of ordinary skill in the art will understand that present embodiments are also directed to various apparatus such as a server apparatus including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present example embodiments.

While some of the above examples have been described as occurring in a particular order, it will be appreciated to persons skilled in the art that some of the messages or steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps of the conversations may be repeated, as necessary. Elements described as methods or steps similarly apply to systems or subcomponents, and vice-versa.

The term "computer readable medium" as used herein includes any medium which can store instructions, program steps, or the like, for use by or execution by a computer or other computing device including, but not limited to: magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid state disk", other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY Disc.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the present disclosure, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A pump unit casing, comprising:
- a suction flange and a discharge flange;
- a first back pressure activated flow prevention flap to permit flow to the discharge flange and which is rotatable;
- a second back pressure activated flow prevention flap to permit flow to the discharge flange and which is independently rotatable from the first back pressure activated flow prevention flap, wherein the first back pressure activated flow prevention flap abuts the second back pressure activated flow prevention flap when one or both are rotated towards each other;
- a first suction bay hydraulically fed from the suction flange; and
- a second suction bay hydraulically fed from the suction flange;
- wherein the pump unit casing has a flat bottom surface of exactly two flat regions of contact comprising a first exterior flange and a second exterior flange;
- wherein the first exterior flange which has a first flattened surface and is integrally formed to and is positioned directly below the first suction bay, wherein the first exterior flange extends lower than the suction flange and the discharge flange when the pump unit is vertically oriented;
- wherein the second exterior flange which has a second flattened surface and is integrally formed to and is positioned directly below the second suction bay, wherein the second exterior flange extends lower than the suction flange and the discharge flange when the pump unit is vertically oriented;
- wherein the first exterior flange and the second exterior flange are horizontally aligned when the pump unit is vertically oriented, so that the first exterior flange and the second exterior flange collectively provide the flat bottom surface;
- wherein the first exterior flange and the second exterior flange each have a flat cross shape that collectively define the flat bottom surface; and
- wherein the suction flange and the discharge flange are floating and above the first exterior flange and the second exterior flange when the pump unit is vertically oriented.

2. The pump unit casing as claimed in claim 1, further comprising a first touchscreen on the pump unit casing for a first input and/or a first output and further comprising a second touchscreen on the pump unit casing for a second input and/or a second output.

3. The pump unit casing as claimed in claim 2, wherein the first touchscreen and the second touchscreen are each configured to facilitate setup and/or commissioning.

4. The pump unit casing as claimed in claim 2, wherein the first touchscreen and the second touchscreen are each in the form of a computer tablet.

5. The pump unit casing as claimed in claim 1, wherein hydraulic characteristics of the pump unit casing though the first suction bay and the second suction bay to the discharge flange provides hydraulically identical net flow and head pressure.

6. The pump unit casing as claimed in claim 1, wherein the pump unit casing is substantially symmetrical.

7. The pump unit casing as claimed in claim 1, wherein the pump unit casing comprises a sealed casing.

* * * * *